(12) United States Patent
Soroushian

(10) Patent No.: US 11,611,785 B2
(45) Date of Patent: *Mar. 21, 2023

(54) SYSTEMS AND METHODS FOR ENCODING AND STREAMING VIDEO ENCODED USING A PLURALITY OF MAXIMUM BITRATE LEVELS

(71) Applicant: DIVX, LLC, San Diego, CA (US)

(72) Inventor: Kourosh Soroushian, San Diego, CA (US)

(73) Assignee: DIVX, LLC, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/181,996

(22) Filed: Feb. 22, 2021

(65) Prior Publication Data

US 2021/0250627 A1    Aug. 12, 2021

Related U.S. Application Data

(63) Continuation of application No. 16/789,303, filed on Feb. 12, 2020, now Pat. No. 10,931,982, which is a
(Continued)

(51) Int. Cl.
*H04N 21/2343* (2011.01)
*H04N 19/115* (2014.01)
(Continued)

(52) U.S. Cl.
CPC ... *H04N 21/234372* (2013.01); *H04N 19/115* (2014.11); *H04N 19/146* (2014.11);
(Continued)

(58) Field of Classification Search
CPC .............. H04N 19/146; H04N 19/172; H04N 21/234372
See application file for complete search history.

(56) References Cited

U.S. PATENT DOCUMENTS

| 3,919,474 A | 11/1975 | Benson |
| 4,009,331 A | 2/1977 | Goldmark et al. |

(Continued)

FOREIGN PATENT DOCUMENTS

| AU | 2010202963 A1 | 2/2012 |
| CA | 2237293 A1 | 7/1997 |

(Continued)

OTHER PUBLICATIONS

Broadq—The Ultimate Home Entertainment Software, printed May 11, 2009 from ittp://web.srchive.org/web/20030401122010/www.broadq.com/qcasttuner/, 1 pg.
(Continued)

*Primary Examiner* — Zhubing Ren
(74) *Attorney, Agent, or Firm* — KPPB LLP

(57) ABSTRACT

Systems and methods for streaming and playing back video having a variety of resolutions, frame rates, and/or sample aspect ratios, where the video streams are encoded at one of a number of maximum bit rate levels, in accordance with embodiments of the invention are disclosed. One embodiment includes a processor, and storage containing data relating combinations of resolution and frame rates to maximum bitrates, where a plurality of resolution and frame rates that are related to the same maximum bitrate form a maximum bitrate level. In addition, an encoding application configures the processor to encode a video stream as a plurality of video streams having different resolutions and frame rates, where the target maximum bitrate used during the encoding is selected based upon the maximum bitrate levels of the resolution and frame rate combinations indicated within the data relating combinations of resolution and frame rates to maximum bitrates.

19 Claims, 6 Drawing Sheets

Related U.S. Application Data continuation of application No. 15/922,198, filed on Mar. 15, 2018, now Pat. No. 10,645,429, which is a continuation of application No. 13/600,046, filed on Aug. 30, 2012, now Pat. No. 9,955,195.

(60) Provisional application No. 61/529,201, filed on Aug. 30, 2011.

(51) Int. Cl.
*H04N 19/146* (2014.01)
*H04N 19/157* (2014.01)
*H04N 21/2662* (2011.01)

(52) U.S. Cl.
CPC ..... *H04N 19/157* (2014.11); *H04N 21/23439* (2013.01); *H04N 21/234381* (2013.01); *H04N 21/2662* (2013.01)

(56) References Cited

U.S. PATENT DOCUMENTS

| | | |
|---|---|---|
| 4,694,357 A | 9/1987 | Rahman et al. |
| 4,802,170 A | 1/1989 | Trottier |
| 4,964,069 A | 10/1990 | Ely |
| 4,974,260 A | 11/1990 | Rudak |
| 5,119,474 A | 6/1992 | Beitel et al. |
| 5,274,758 A | 12/1993 | Beitel et al. |
| 5,361,332 A | 11/1994 | Yoshida et al. |
| 5,396,497 A | 3/1995 | Veltman |
| 5,400,401 A | 3/1995 | Wasilewski et al. |
| 5,404,436 A | 4/1995 | Hamilton |
| 5,420,801 A | 5/1995 | Dockter et al. |
| 5,420,974 A | 5/1995 | Morris et al. |
| 5,471,576 A | 11/1995 | Yee |
| 5,477,272 A | 12/1995 | Zhang et al. |
| 5,487,167 A | 1/1996 | Dinallo et al. |
| 5,533,021 A | 7/1996 | Branstad et al. |
| 5,537,408 A | 7/1996 | Branstad et al. |
| 5,539,908 A | 7/1996 | Chen et al. |
| 5,541,662 A | 7/1996 | Adams et al. |
| 5,574,785 A | 11/1996 | Ueno et al. |
| 5,583,652 A | 12/1996 | Ware |
| 5,600,721 A | 2/1997 | Kitazato |
| 5,621,794 A | 4/1997 | Matsuda et al. |
| 5,627,936 A | 5/1997 | Prasad |
| 5,633,472 A | 5/1997 | DeWitt et al. |
| 5,642,171 A | 6/1997 | Baumgartner et al. |
| 5,642,338 A | 6/1997 | Fukushima et al. |
| 5,655,117 A | 8/1997 | Goldberg et al. |
| 5,664,044 A | 9/1997 | Ware |
| 5,675,382 A | 10/1997 | Bauchspies |
| 5,675,511 A | 10/1997 | Prasad et al. |
| 5,684,542 A | 11/1997 | Tsukagoshi |
| 5,717,394 A | 2/1998 | Schwartz et al. |
| 5,719,786 A | 2/1998 | Nelson et al. |
| 5,745,643 A | 4/1998 | Mishina |
| 5,751,280 A | 5/1998 | Abbott |
| 5,763,800 A | 6/1998 | Rossum et al. |
| 5,765,164 A | 6/1998 | Prasad et al. |
| 5,794,018 A | 8/1998 | Vrvilo et al. |
| 5,805,228 A | 9/1998 | Proctor et al. |
| 5,805,700 A | 9/1998 | Nardone et al. |
| 5,813,010 A | 9/1998 | Kurano et al. |
| 5,822,524 A | 10/1998 | Chen et al. |
| 5,828,370 A | 10/1998 | Moeller et al. |
| 5,844,575 A | 12/1998 | Reid |
| 5,848,217 A | 12/1998 | Tsukagoshi et al. |
| 5,854,873 A | 12/1998 | Mori et al. |
| 5,903,261 A | 5/1999 | Walsh et al. |
| 5,907,597 A | 5/1999 | Mark |
| 5,907,658 A | 5/1999 | Murase et al. |
| 5,912,710 A | 6/1999 | Fujimoto |
| 5,923,869 A | 7/1999 | Kashiwagi et al. |
| 5,956,729 A | 9/1999 | Goetz et al. |
| 5,959,690 A | 9/1999 | Toebes, VIII et al. |
| 5,990,955 A | 11/1999 | Koz |
| 6,002,834 A | 12/1999 | Hirabayashi et al. |
| 6,005,621 A | 12/1999 | Linzer et al. |
| 6,009,237 A | 12/1999 | Hirabayashi et al. |
| 6,016,381 A | 1/2000 | Taira et al. |
| 6,031,622 A | 2/2000 | Ristow et al. |
| 6,046,778 A | 4/2000 | Nonomura et al. |
| 6,057,832 A | 5/2000 | Lev et al. |
| 6,065,050 A | 5/2000 | DeMoney |
| 6,079,566 A | 6/2000 | Eleftheriadis et al. |
| 6,157,410 A | 12/2000 | Izumi et al. |
| 6,169,242 B1 | 1/2001 | Fay et al. |
| 6,192,154 B1 | 2/2001 | Rajagopalan et al. |
| 6,195,388 B1 | 2/2001 | Choi et al. |
| 6,204,883 B1 | 3/2001 | Tsukagoshi |
| 6,246,803 B1 | 6/2001 | Gauch et al. |
| 6,266,483 B1 | 7/2001 | Okada et al. |
| 6,282,320 B1 | 8/2001 | Hasegawa et al. |
| 6,308,005 B1 | 10/2001 | Ando et al. |
| 6,320,905 B1 | 11/2001 | Konstantinides |
| 6,330,286 B1 | 12/2001 | Lyons et al. |
| 6,351,538 B1 | 2/2002 | Uz |
| 6,373,803 B2 | 4/2002 | Ando et al. |
| 6,374,144 B1 | 4/2002 | Viviani et al. |
| 6,395,969 B1 | 5/2002 | Fuhrer |
| 6,415,031 B1 | 7/2002 | Colligan et al. |
| 6,430,354 B1 | 8/2002 | Watanabe |
| 6,445,877 B1 | 9/2002 | Okada et al. |
| 6,453,115 B1 | 9/2002 | Boyle |
| 6,453,116 B1 | 9/2002 | Ando et al. |
| 6,481,012 B1 | 11/2002 | Gordon et al. |
| 6,504,873 B1 | 1/2003 | Vehvilaeinen |
| 6,512,883 B2 | 1/2003 | Shim et al. |
| 6,594,699 B1 | 7/2003 | Sahai et al. |
| 6,614,843 B1 | 9/2003 | Gordon et al. |
| 6,654,933 B1 | 11/2003 | Abbott et al. |
| 6,658,056 B1 | 12/2003 | Duruöz et al. |
| 6,665,835 B1 | 12/2003 | Gutfreund et al. |
| 6,671,408 B1 | 12/2003 | Kaku |
| 6,690,838 B2 | 2/2004 | Zhou |
| 6,697,568 B1 | 2/2004 | Kaku |
| 6,724,944 B1 | 4/2004 | Kalevo et al. |
| 6,725,281 B1 | 4/2004 | Zintel et al. |
| 6,751,623 B1 | 6/2004 | Basso et al. |
| 6,807,306 B1 | 10/2004 | Girgensohn et al. |
| 6,813,437 B2 | 11/2004 | Ando et al. |
| 6,819,394 B1 | 11/2004 | Nomura et al. |
| 6,856,997 B2 | 2/2005 | Lee et al. |
| 6,859,496 B1 | 2/2005 | Boroczky et al. |
| 6,871,006 B1 | 3/2005 | Oguz et al. |
| 6,912,513 B1 | 6/2005 | Candelore |
| 6,917,652 B2 | 7/2005 | Lyu |
| 6,920,179 B1 | 7/2005 | Anand et al. |
| 6,931,531 B1 | 8/2005 | Takahashi |
| 6,944,621 B1 | 9/2005 | Collart |
| 6,944,629 B1 | 9/2005 | Shioi et al. |
| 6,956,901 B2 | 10/2005 | Boroczky et al. |
| 6,957,350 B1 | 10/2005 | Demos |
| 6,970,564 B1 | 11/2005 | Kubota et al. |
| 6,983,079 B2 | 1/2006 | Kim |
| 6,985,588 B1 | 1/2006 | Glick et al. |
| 6,988,144 B1 | 1/2006 | Luken et al. |
| 7,006,757 B2 | 2/2006 | Ando et al. |
| 7,007,170 B2 | 2/2006 | Morten |
| 7,020,287 B2 | 3/2006 | Unger |
| 7,127,155 B2 | 10/2006 | Ando et al. |
| 7,151,832 B1 | 12/2006 | Fetkovich et al. |
| 7,188,183 B1 | 3/2007 | Paul et al. |
| 7,209,892 B1 | 4/2007 | Galuten et al. |
| 7,212,726 B2 | 5/2007 | Zetts |
| 7,237,061 B1 | 6/2007 | Boic |
| 7,242,772 B1 | 7/2007 | Tehranchi |
| 7,274,861 B2 | 9/2007 | Yahata et al. |
| 7,295,673 B2 | 11/2007 | Grab et al. |
| 7,330,875 B1 | 2/2008 | Parasnis et al. |
| 7,340,528 B2 | 3/2008 | Noblecourt et al. |
| 7,349,886 B2 | 3/2008 | Morten et al. |
| 7,352,956 B1 | 4/2008 | Winter et al. |

(56) References Cited

U.S. PATENT DOCUMENTS

| | | |
|---|---|---|
| 7,356,245 B2 | 4/2008 | Belknap et al. |
| 7,366,788 B2 | 4/2008 | Jones et al. |
| 7,382,879 B1 | 6/2008 | Miller |
| 7,397,853 B2 | 7/2008 | Kwon et al. |
| 7,400,679 B2 | 7/2008 | Kwon et al. |
| 7,418,132 B2 | 8/2008 | Hoshuyama |
| 7,457,359 B2 | 11/2008 | Mabey et al. |
| 7,457,415 B2 | 11/2008 | Reitmeier et al. |
| 7,478,325 B2 | 1/2009 | Foehr |
| 7,493,018 B2 | 2/2009 | Kim |
| 7,499,930 B2 | 3/2009 | Naka et al. |
| 7,499,938 B2 | 3/2009 | Collart |
| 7,546,641 B2 | 6/2009 | Robert et al. |
| 7,639,921 B2 | 12/2009 | Seo et al. |
| 7,640,435 B2 | 12/2009 | Morten |
| 7,711,052 B2 | 5/2010 | Hannuksela et al. |
| 7,728,878 B2 | 6/2010 | Yea et al. |
| 7,853,980 B2 | 12/2010 | Pedlow, Jr. et al. |
| 7,864,186 B2 | 1/2011 | Robotham et al. |
| 7,869,691 B2 | 1/2011 | Kelly et al. |
| 7,945,143 B2 | 5/2011 | Yahata et al. |
| 8,023,562 B2 | 9/2011 | Zheludkov et al. |
| 8,046,453 B2 | 10/2011 | Olaiya |
| 8,054,880 B2 | 11/2011 | Yu et al. |
| 8,131,875 B1 | 3/2012 | Chen |
| 8,169,916 B1 | 5/2012 | Pai et al. |
| 8,225,061 B2 | 7/2012 | Greenebaum |
| 8,233,768 B2 | 7/2012 | Soroushian et al. |
| 8,243,924 B2 | 8/2012 | Chen et al. |
| 8,249,168 B2 | 8/2012 | Graves |
| 8,270,473 B2 | 9/2012 | Chen et al. |
| 8,270,819 B2 | 9/2012 | Vannier |
| 8,286,213 B2 | 10/2012 | Seo |
| 8,289,338 B2 | 10/2012 | Priyadarshi et al. |
| 8,311,115 B2 | 11/2012 | Gu et al. |
| 8,312,079 B2 | 11/2012 | Newsome et al. |
| 8,321,556 B1 | 11/2012 | Chatterjee et al. |
| 8,369,421 B2 | 2/2013 | Kadono et al. |
| 8,386,621 B2 | 2/2013 | Park |
| 8,396,114 B2 | 3/2013 | Gu et al. |
| 8,456,380 B2 | 6/2013 | Pagan |
| 8,472,792 B2 | 6/2013 | Butt et al. |
| 8,649,669 B2 | 2/2014 | Braness et al. |
| 8,683,066 B2 | 3/2014 | Hurst et al. |
| RE45,052 E | 7/2014 | Li |
| 8,767,825 B1 * | 7/2014 | Wang ................ H04N 19/19 375/240.1 |
| 8,768,984 B2 | 7/2014 | Priddle et al. |
| 8,782,268 B2 | 7/2014 | Pyle et al. |
| 8,818,171 B2 | 8/2014 | Soroushian et al. |
| 8,819,116 B1 | 8/2014 | Tomay et al. |
| 8,832,297 B2 | 9/2014 | Soroushian et al. |
| 8,849,950 B2 | 9/2014 | Stockhammer et al. |
| 8,897,370 B1 * | 11/2014 | Wang ................ H04N 19/139 375/240.2 |
| 8,914,534 B2 | 12/2014 | Braness et al. |
| 9,021,119 B2 | 4/2015 | Van Der Schaar et al. |
| 9,025,659 B2 | 5/2015 | Soroushian et al. |
| 9,038,116 B1 | 5/2015 | Knox et al. |
| 9,197,944 B2 | 11/2015 | Reisner |
| 9,215,466 B2 | 12/2015 | Zhai et al. |
| 9,344,721 B2 | 5/2016 | Dikvall |
| 9,350,990 B2 | 5/2016 | Orton-Jay et al. |
| 9,357,210 B2 | 5/2016 | Orton-Jay et al. |
| 9,467,708 B2 | 10/2016 | Soroushian et al. |
| 9,510,031 B2 | 11/2016 | Soroushian et al. |
| 9,571,827 B2 | 2/2017 | Su et al. |
| 9,661,049 B2 | 5/2017 | Gordon |
| 9,712,890 B2 | 7/2017 | Shivadas et al. |
| 9,955,195 B2 | 4/2018 | Soroushian |
| 10,148,989 B2 | 12/2018 | Amidei et al. |
| 10,452,715 B2 | 10/2019 | Soroushian et al. |
| 10,595,070 B2 | 3/2020 | Amidei et al. |
| 10,645,429 B2 | 5/2020 | Soroushian |
| 10,708,587 B2 | 7/2020 | Soroushian et al. |
| 10,798,143 B2 | 10/2020 | Soroushian et al. |
| 10,931,982 B2 | 2/2021 | Soroushian |
| 2001/0021276 A1 | 9/2001 | Zhou |
| 2001/0030710 A1 | 10/2001 | Werner |
| 2001/0052077 A1 | 12/2001 | Fung et al. |
| 2001/0052127 A1 | 12/2001 | Seo et al. |
| 2002/0034252 A1 | 3/2002 | Owen et al. |
| 2002/0048450 A1 | 4/2002 | Zetts |
| 2002/0051494 A1 | 5/2002 | Yamaguchi et al. |
| 2002/0062313 A1 | 5/2002 | Lee et al. |
| 2002/0067432 A1 | 6/2002 | Kondo et al. |
| 2002/0076112 A1 | 6/2002 | Devara |
| 2002/0085638 A1 | 7/2002 | Morad et al. |
| 2002/0087569 A1 | 7/2002 | Fischer et al. |
| 2002/0089523 A1 | 7/2002 | Hodgkinson |
| 2002/0091665 A1 | 7/2002 | Beek et al. |
| 2002/0093571 A1 | 7/2002 | Hyodo |
| 2002/0094031 A1 | 7/2002 | Ngai et al. |
| 2002/0110193 A1 | 8/2002 | Yoo et al. |
| 2002/0118953 A1 | 8/2002 | Kim |
| 2002/0120498 A1 | 8/2002 | Gordon et al. |
| 2002/0135607 A1 | 9/2002 | Kato et al. |
| 2002/0141503 A1 | 10/2002 | Kobayashi et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0151992 A1 | 10/2002 | Hoffberg et al. |
| 2002/0154779 A1 | 10/2002 | Asano et al. |
| 2002/0161462 A1 | 10/2002 | Fay |
| 2002/0164024 A1 | 11/2002 | Arakawa et al. |
| 2002/0169971 A1 | 11/2002 | Asano et al. |
| 2002/0180929 A1 | 12/2002 | Tseng et al. |
| 2002/0184159 A1 | 12/2002 | Tadayon et al. |
| 2002/0191112 A1 | 12/2002 | Akiyoshi et al. |
| 2002/0191960 A1 | 12/2002 | Fujinami et al. |
| 2003/0001964 A1 | 1/2003 | Masukura et al. |
| 2003/0002577 A1 | 1/2003 | Pinder |
| 2003/0002578 A1 | 1/2003 | Tsukagoshi et al. |
| 2003/0005442 A1 | 1/2003 | Brodersen et al. |
| 2003/0012275 A1 | 1/2003 | Boice et al. |
| 2003/0035488 A1 | 2/2003 | Barrau |
| 2003/0044080 A1 | 3/2003 | Frishman et al. |
| 2003/0053541 A1 | 3/2003 | Sun et al. |
| 2003/0063675 A1 | 4/2003 | Kang et al. |
| 2003/0077071 A1 | 4/2003 | Lin et al. |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0135742 A1 | 7/2003 | Evans |
| 2003/0142594 A1 | 7/2003 | Tsumagari et al. |
| 2003/0142872 A1 | 7/2003 | Koyanagi |
| 2003/0152370 A1 | 8/2003 | Otomo et al. |
| 2003/0165328 A1 | 9/2003 | Grecia |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0206717 A1 | 11/2003 | Yogeshwar et al. |
| 2003/0216922 A1 | 11/2003 | Gonzales et al. |
| 2003/0231863 A1 | 12/2003 | Eerenberg et al. |
| 2003/0231867 A1 | 12/2003 | Gates et al. |
| 2003/0236836 A1 | 12/2003 | Borthwick |
| 2004/0001594 A1 | 1/2004 | Krishnaswamy et al. |
| 2004/0006701 A1 | 1/2004 | Kresina |
| 2004/0021684 A1 | 2/2004 | Millner |
| 2004/0022391 A1 | 2/2004 | Obrien |
| 2004/0025180 A1 | 2/2004 | Begeja et al. |
| 2004/0028227 A1 | 2/2004 | Yu |
| 2004/0037421 A1 | 2/2004 | Truman |
| 2004/0047592 A1 | 3/2004 | Seo et al. |
| 2004/0047607 A1 | 3/2004 | Seo et al. |
| 2004/0047614 A1 | 3/2004 | Green |
| 2004/0052501 A1 | 3/2004 | Tam |
| 2004/0071453 A1 | 4/2004 | Valderas |
| 2004/0076237 A1 | 4/2004 | Kadono et al. |
| 2004/0081333 A1 | 4/2004 | Grab et al. |
| 2004/0081434 A1 | 4/2004 | Jung et al. |
| 2004/0093494 A1 | 5/2004 | Nishimoto et al. |

(56) References Cited

U.S. PATENT DOCUMENTS

| | | |
|---|---|---|
| 2004/0101059 A1 | 5/2004 | Joch et al. |
| 2004/0107356 A1 | 6/2004 | Shamoon et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0143760 A1 | 7/2004 | Alkove et al. |
| 2004/0146276 A1 | 7/2004 | Ogawa |
| 2004/0150747 A1 | 8/2004 | Sita |
| 2004/0208245 A1 | 10/2004 | Macinnis et al. |
| 2004/0213547 A1* | 10/2004 | Hayes .................. G11B 27/034 386/220 |
| 2004/0217971 A1 | 11/2004 | Kim |
| 2004/0255236 A1 | 12/2004 | Collart |
| 2005/0013494 A1 | 1/2005 | Srinivasan et al. |
| 2005/0015797 A1 | 1/2005 | Noblecourt et al. |
| 2005/0038826 A1 | 2/2005 | Bae et al. |
| 2005/0052294 A1 | 3/2005 | Liang et al. |
| 2005/0055399 A1 | 3/2005 | Savchuk |
| 2005/0063541 A1 | 3/2005 | Candelore |
| 2005/0076232 A1 | 4/2005 | Kawaguchi |
| 2005/0089091 A1* | 4/2005 | Kim .................. H04N 19/573 375/240.01 |
| 2005/0144468 A1 | 6/2005 | Northcutt |
| 2005/0157948 A1 | 7/2005 | Lee |
| 2005/0177741 A1 | 8/2005 | Chen et al. |
| 2005/0180641 A1 | 8/2005 | Clark |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0207442 A1 | 9/2005 | Zoest et al. |
| 2005/0207578 A1 | 9/2005 | Matsuyama et al. |
| 2005/0210145 A1 | 9/2005 | Kim et al. |
| 2005/0243912 A1 | 11/2005 | Kwon et al. |
| 2005/0265555 A1 | 12/2005 | Pippuri |
| 2005/0273695 A1 | 12/2005 | Schnurr |
| 2005/0275656 A1 | 12/2005 | Corbin et al. |
| 2006/0013568 A1 | 1/2006 | Rodriguez |
| 2006/0015813 A1 | 1/2006 | Chung et al. |
| 2006/0039481 A1 | 2/2006 | Shen et al. |
| 2006/0072672 A1 | 4/2006 | Holcomb et al. |
| 2006/0078301 A1 | 4/2006 | Ikeda et al. |
| 2006/0083302 A1* | 4/2006 | Han .................. H04N 19/59 375/E7.199 |
| 2006/0093320 A1 | 5/2006 | Hallberg et al. |
| 2006/0126717 A1 | 6/2006 | Boyce et al. |
| 2006/0129909 A1 | 6/2006 | Butt et al. |
| 2006/0165163 A1 | 7/2006 | Burazerovic et al. |
| 2006/0168639 A1 | 7/2006 | Gan et al. |
| 2006/0173887 A1 | 8/2006 | Breitfeld et al. |
| 2006/0181965 A1 | 8/2006 | Collart |
| 2006/0182139 A1 | 8/2006 | Bugajski et al. |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2007/0005333 A1 | 1/2007 | Setiohardjo et al. |
| 2007/0024706 A1 | 2/2007 | Brannon, Jr. et al. |
| 2007/0031110 A1 | 2/2007 | Rijckaert |
| 2007/0047645 A1 | 3/2007 | Takashima |
| 2007/0047901 A1 | 3/2007 | Ando et al. |
| 2007/0053293 A1 | 3/2007 | Mcdonald et al. |
| 2007/0053444 A1 | 3/2007 | Shibata et al. |
| 2007/0067472 A1 | 3/2007 | Maertens et al. |
| 2007/0083467 A1 | 4/2007 | Lindahl et al. |
| 2007/0083617 A1 | 4/2007 | Chakrabarti et al. |
| 2007/0086528 A1 | 4/2007 | Mauchly et al. |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0177812 A1 | 8/2007 | Yang et al. |
| 2007/0180051 A1 | 8/2007 | Kelly et al. |
| 2007/0180125 A1 | 8/2007 | Knowles et al. |
| 2007/0239839 A1 | 10/2007 | Buday et al. |
| 2007/0292107 A1 | 12/2007 | Yahata et al. |
| 2008/0030614 A1 | 2/2008 | Schwab |
| 2008/0052306 A1 | 2/2008 | Wang et al. |
| 2008/0063051 A1 | 3/2008 | Kwon et al. |
| 2008/0069204 A1 | 3/2008 | Uchiike |
| 2008/0086570 A1 | 4/2008 | Dey et al. |
| 2008/0101466 A1 | 5/2008 | Swenson et al. |
| 2008/0101718 A1 | 5/2008 | Yang et al. |
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0126248 A1 | 5/2008 | Lee et al. |
| 2008/0137736 A1 | 6/2008 | Richardson et al. |
| 2008/0137847 A1 | 6/2008 | Candelore et al. |
| 2008/0137848 A1 | 6/2008 | Kocher et al. |
| 2008/0192818 A1 | 8/2008 | DiPietro et al. |
| 2008/0196076 A1 | 8/2008 | Shatz et al. |
| 2008/0232456 A1 | 9/2008 | Terashima et al. |
| 2008/0253454 A1 | 10/2008 | Imamura et al. |
| 2008/0256105 A1 | 10/2008 | Nogawa et al. |
| 2008/0263354 A1 | 10/2008 | Beuque et al. |
| 2008/0266522 A1 | 10/2008 | Weisgerber |
| 2008/0279535 A1 | 11/2008 | Haque et al. |
| 2008/0310496 A1 | 12/2008 | Fang |
| 2009/0010622 A1 | 1/2009 | Yahata et al. |
| 2009/0013195 A1 | 1/2009 | Ochi et al. |
| 2009/0031220 A1 | 1/2009 | Tranchant et al. |
| 2009/0037959 A1 | 2/2009 | Suh et al. |
| 2009/0060452 A1 | 3/2009 | Chaudhri |
| 2009/0066839 A1 | 3/2009 | Jung et al. |
| 2009/0077143 A1 | 3/2009 | Macy, Jr. |
| 2009/0106082 A1 | 4/2009 | Senti et al. |
| 2009/0116821 A1 | 5/2009 | Shibamiya et al. |
| 2009/0132599 A1 | 5/2009 | Soroushian et al. |
| 2009/0132721 A1 | 5/2009 | Soroushian et al. |
| 2009/0150557 A1 | 6/2009 | Wormley et al. |
| 2009/0169181 A1 | 7/2009 | Priyadarshi et al. |
| 2009/0178090 A1 | 7/2009 | Oztaskent |
| 2009/0201988 A1 | 8/2009 | Gazier et al. |
| 2009/0226148 A1 | 9/2009 | Nesvadba et al. |
| 2009/0249081 A1 | 10/2009 | Zayas |
| 2009/0282162 A1 | 11/2009 | Mehrotra et al. |
| 2009/0293116 A1 | 11/2009 | DeMello |
| 2009/0300204 A1 | 12/2009 | Zhang et al. |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310819 A1 | 12/2009 | Hatano |
| 2009/0313544 A1 | 12/2009 | Wood et al. |
| 2009/0313564 A1 | 12/2009 | Rottler et al. |
| 2009/0328124 A1 | 12/2009 | Khouzam et al. |
| 2010/0002069 A1 | 1/2010 | Eleftheriadis et al. |
| 2010/0040351 A1 | 2/2010 | Toma et al. |
| 2010/0094969 A1 | 4/2010 | Zuckerman et al. |
| 2010/0095121 A1 | 4/2010 | Shetty et al. |
| 2010/0111192 A1 | 5/2010 | Graves |
| 2010/0142915 A1 | 6/2010 | Mcdermott et al. |
| 2010/0146055 A1 | 6/2010 | Hannuksela et al. |
| 2010/0158109 A1 | 6/2010 | Dahlby et al. |
| 2010/0189183 A1 | 7/2010 | Gu et al. |
| 2010/0195713 A1 | 8/2010 | Coulombe et al. |
| 2010/0226582 A1 | 9/2010 | Luo et al. |
| 2010/0228795 A1 | 9/2010 | Hahn |
| 2010/0259690 A1 | 10/2010 | Wang et al. |
| 2010/0262712 A1 | 10/2010 | Kim et al. |
| 2010/0278271 A1 | 11/2010 | MacInnis |
| 2010/0284473 A1 | 11/2010 | Suh et al. |
| 2011/0010466 A1 | 1/2011 | Fan et al. |
| 2011/0022432 A1 | 1/2011 | Ishida et al. |
| 2011/0055585 A1 | 3/2011 | Lee |
| 2011/0058675 A1 | 3/2011 | Brueck et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0099594 A1 | 4/2011 | Chen et al. |
| 2011/0103374 A1 | 5/2011 | Lajoie et al. |
| 2011/0126104 A1 | 5/2011 | Woods et al. |
| 2011/0126191 A1 | 5/2011 | Hughes et al. |

(56) References Cited

U.S. PATENT DOCUMENTS

| | | |
|---|---|---|
| 2011/0129011 A1 | 6/2011 | Cilli et al. |
| 2011/0135090 A1 | 6/2011 | Chan et al. |
| 2011/0142415 A1 | 6/2011 | Rhyu |
| 2011/0145858 A1 | 6/2011 | Philpott et al. |
| 2011/0150100 A1 | 6/2011 | Abadir |
| 2011/0153785 A1 | 6/2011 | Minborg et al. |
| 2011/0164679 A1* | 7/2011 | Satou .............. H04N 19/61 375/240.03 |
| 2011/0170408 A1* | 7/2011 | Furbeck .............. H04L 47/12 370/230 |
| 2011/0173345 A1 | 7/2011 | Knox et al. |
| 2011/0179185 A1 | 7/2011 | Wang et al. |
| 2011/0197261 A1 | 8/2011 | Dong et al. |
| 2011/0239078 A1 | 9/2011 | Luby et al. |
| 2011/0246659 A1 | 10/2011 | Bouazizi |
| 2011/0246661 A1 | 10/2011 | Manzari et al. |
| 2011/0268178 A1 | 11/2011 | Park et al. |
| 2011/0280307 A1 | 11/2011 | MacInnis et al. |
| 2011/0296048 A1 | 12/2011 | Knox et al. |
| 2011/0302319 A1 | 12/2011 | Ha et al. |
| 2011/0305273 A1 | 12/2011 | He et al. |
| 2011/0310982 A1 | 12/2011 | Yang et al. |
| 2011/0314130 A1 | 12/2011 | Strasman |
| 2011/0314176 A1 | 12/2011 | Frojdh et al. |
| 2011/0314500 A1 | 12/2011 | Gordon |
| 2012/0005312 A1 | 1/2012 | Mcgowan et al. |
| 2012/0023251 A1 | 1/2012 | Pyle et al. |
| 2012/0042090 A1 | 2/2012 | Chen et al. |
| 2012/0047542 A1 | 2/2012 | Lewis et al. |
| 2012/0072493 A1 | 3/2012 | Muriello et al. |
| 2012/0093214 A1 | 4/2012 | Urbach |
| 2012/0105279 A1 | 5/2012 | Brown et al. |
| 2012/0110120 A1 | 5/2012 | Willig et al. |
| 2012/0167132 A1 | 6/2012 | Mathews et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0203766 A1 | 8/2012 | Hörnkvist et al. |
| 2012/0269275 A1 | 10/2012 | Hannuksela |
| 2012/0278496 A1 | 11/2012 | Hsu |
| 2012/0281767 A1 | 11/2012 | Duenas et al. |
| 2012/0307883 A1 | 12/2012 | Graves |
| 2012/0311174 A1 | 12/2012 | Bichot et al. |
| 2012/0316941 A1 | 12/2012 | Moshfeghi |
| 2012/0331167 A1 | 12/2012 | Hunt |
| 2013/0007200 A1 | 1/2013 | van der Schaar et al. |
| 2013/0013803 A1 | 1/2013 | Bichot et al. |
| 2013/0019257 A1 | 1/2013 | Tschernutter et al. |
| 2013/0028534 A1 | 1/2013 | Tatsuka et al. |
| 2013/0044821 A1 | 2/2013 | Braness et al. |
| 2013/0046902 A1 | 2/2013 | Villegas Nuñez et al. |
| 2013/0051767 A1 | 2/2013 | Soroushian et al. |
| 2013/0051768 A1 | 2/2013 | Soroushian et al. |
| 2013/0054958 A1 | 2/2013 | Braness et al. |
| 2013/0055084 A1 | 2/2013 | Soroushian et al. |
| 2013/0058393 A1 | 3/2013 | Soroushian |
| 2013/0061045 A1 | 3/2013 | Kiefer et al. |
| 2013/0080267 A1 | 3/2013 | McGowan |
| 2013/0091249 A1 | 4/2013 | McHugh et al. |
| 2013/0095855 A1 | 4/2013 | Bort |
| 2013/0097172 A1 | 4/2013 | McIntosh |
| 2013/0097309 A1 | 4/2013 | Ma et al. |
| 2013/0128970 A1 | 5/2013 | Yu et al. |
| 2013/0169863 A1 | 7/2013 | Smith |
| 2013/0191754 A1 | 7/2013 | Rose |
| 2013/0196292 A1 | 8/2013 | Brennen et al. |
| 2013/0279810 A1 | 10/2013 | Li et al. |
| 2014/0003501 A1 | 1/2014 | Soroushian et al. |
| 2014/0003523 A1 | 1/2014 | Soroushian et al. |
| 2014/0059243 A1 | 2/2014 | Reisner |
| 2014/0140253 A1 | 5/2014 | Lohmar et al. |
| 2014/0149557 A1 | 5/2014 | Lohmar et al. |
| 2014/0211840 A1 | 7/2014 | Butt et al. |
| 2014/0241421 A1 | 8/2014 | Orton-jay et al. |
| 2014/0250473 A1 | 9/2014 | Braness et al. |
| 2014/0355958 A1 | 12/2014 | Soroushian et al. |
| 2014/0359680 A1 | 12/2014 | Shivadas et al. |
| 2015/0036758 A1 | 2/2015 | Sato |
| 2015/0104153 A1 | 4/2015 | Braness et al. |
| 2015/0229695 A1 | 8/2015 | Kim et al. |
| 2015/0288530 A1 | 10/2015 | Oyman |
| 2016/0073176 A1 | 3/2016 | Phillips et al. |
| 2016/0127440 A1 | 5/2016 | Gordon |
| 2016/0134881 A1 | 5/2016 | Wang et al. |
| 2017/0026445 A1 | 1/2017 | Soroushian et al. |
| 2017/0041604 A1 | 2/2017 | Soroushian et al. |
| 2017/0366833 A1 | 12/2017 | Amidei et al. |
| 2018/0278975 A1 | 9/2018 | Soroushian |
| 2019/0182524 A1 | 6/2019 | Amidei et al. |
| 2020/0186854 A1 | 6/2020 | Soroushian |
| 2020/0221152 A1 | 7/2020 | Amidei et al. |
| 2020/0396451 A1 | 12/2020 | Soroushian et al. |
| 2021/0021662 A1 | 1/2021 | Soroushian et al. |

FOREIGN PATENT DOCUMENTS

| | | |
|---|---|---|
| CN | 1221284 A | 6/1999 |
| CN | 1662952 A | 8/2005 |
| CN | 1684518 A | 10/2005 |
| CN | 1723696 | 1/2006 |
| CN | 1756359 A | 4/2006 |
| CN | 1787422 A | 6/2006 |
| CN | 101461149 A | 6/2009 |
| CN | 102138327 A | 7/2011 |
| CN | 103858419 A | 6/2014 |
| CN | 103875248 A | 6/2014 |
| CN | 105359511 A | 2/2016 |
| CN | 103875248 B | 9/2018 |
| CN | 108989847 A | 12/2018 |
| CN | 109314784 A | 2/2019 |
| CN | 108989847 B | 3/2021 |
| EP | 757484 A2 | 2/1997 |
| EP | 813167 A2 | 12/1997 |
| EP | 1335603 A2 | 8/2003 |
| EP | 1420580 A1 | 5/2004 |
| EP | 1453319 A1 | 9/2004 |
| EP | 1283640 B1 | 10/2006 |
| EP | 1718074 A1 | 11/2006 |
| EP | 2180664 A1 | 4/2010 |
| EP | 2360923 A1 | 8/2011 |
| EP | 2661895 A2 | 11/2013 |
| EP | 2962461 A1 | 1/2016 |
| EP | 3005689 A1 | 4/2016 |
| EP | 3473005 A1 | 4/2019 |
| HK | 1195183 B | 2/2018 |
| HK | 1260329 A | 12/2019 |
| HK | 1263223 A | 1/2020 |
| HK | 1260329 B | 11/2021 |
| JP | 08163488 A | 6/1996 |
| JP | 08287613 A | 11/1996 |
| JP | 11328929 A | 11/1999 |
| JP | 02001043668 A | 2/2001 |
| JP | 2002170363 A | 6/2002 |
| JP | 2002218384 A | 8/2002 |
| JP | 2003250113 A | 9/2003 |
| JP | 2004320707 A | 11/2004 |
| JP | 2005027153 | 1/2005 |
| JP | 2009508452 A | 2/2009 |
| JP | 2010262255 A | 11/2010 |
| JP | 2011029962 A | 2/2011 |
| JP | 2013026724 A | 2/2013 |
| JP | 2014506430 A | 3/2014 |
| JP | 20165043 A | 1/2016 |
| JP | 2016526336 A | 9/2016 |
| JP | 2019-526188 A | 9/2019 |
| KR | 100221423 B1 | 9/1999 |
| KR | 2002013664 | 2/2002 |
| KR | 1020020064888 A | 8/2002 |
| KR | 20040039852 A | 5/2004 |
| KR | 20060106250 A | 10/2006 |

(56) References Cited

FOREIGN PATENT DOCUMENTS

| | | | |
|---|---|---|---|
| KR | 20110051104 A | 5/2011 | |
| KR | 20140056317 A | 5/2014 | |
| KR | 20160021141 A | 2/2016 | |
| KR | 101823321 B1 | 1/2018 | |
| KR | 101928910 B1 | 12/2018 | |
| KR | 10-1936142 B1 | 1/2019 | |
| KR | 10-1981923 B1 | 5/2019 | |
| KR | 10-2020764 B1 | 9/2019 | |
| KR | 10-2074148 B1 | 1/2020 | |
| KR | 10-2086995 B1 | 3/2020 | |
| KR | 10-2140339 B1 | 7/2020 | |
| KR | 10-2163151 B1 | 12/2020 | |
| KR | 10-2187792 B1 | 12/2020 | |
| KR | 10-2190364 B1 | 12/2020 | |
| KR | 10-2241867 B1 | 4/2021 | |
| KR | 10-2363764 B1 | 2/2022 | |
| KR | 10-2414735 B1 | 6/2022 | |
| RU | 2328040 C2 | 6/2008 | |
| WO | 1995015660 A1 | 6/1995 | |
| WO | 2000049762 A2 | 8/2000 | |
| WO | 2000049763 A1 | 8/2000 | |
| WO | 2001031497 A1 | 5/2001 | |
| WO | 2001050732 A2 | 7/2001 | |
| WO | 2002001880 A1 | 1/2002 | |
| WO | 2003047262 A2 | 6/2003 | |
| WO | 2004012378 A2 | 2/2004 | |
| WO | 2004054247 A1 | 6/2004 | |
| WO | 2004097811 A1 | 11/2004 | |
| WO | 2004100158 A1 | 11/2004 | |
| WO | 2004102571 A1 | 11/2004 | |
| WO | 2005008385 A2 | 1/2005 | |
| WO | 2005015935 A1 | 2/2005 | |
| WO | 2009006302 A1 | 1/2009 | |
| WO | 2009065137 A1 | 5/2009 | |
| WO | 2009109976 A2 | 9/2009 | |
| WO | 2010060106 A1 | 5/2010 | |
| WO | 2010111261 A1 | 9/2010 | |
| WO | 2010122447 A1 | 10/2010 | |
| WO | 2010150470 A1 | 12/2010 | |
| WO | 2011053658 A1 | 5/2011 | |
| WO | 2011059291 A2 | 5/2011 | |
| WO | 2011087449 A1 | 7/2011 | |
| WO | 2011093835 A1 | 8/2011 | |
| WO | 2011101371 A1 | 8/2011 | |
| WO | 2011102791 A1 | 8/2011 | |
| WO | 2011103364 A1 | 8/2011 | |
| WO | 2012094171 A1 | 7/2012 | |
| WO | 20120094181 A2 | 7/2012 | |
| WO | 20120094189 A1 | 7/2012 | |
| WO | 2013033334 A1 | 3/2013 | |
| WO | 2013033335 A1 | 3/2013 | |
| WO | 2013033458 A2 | 3/2013 | |
| WO | 2013033458 A3 | 3/2013 | |
| WO | 2014190308 A1 | 11/2014 | |
| WO | 2017218095 A1 | 12/2017 | |

OTHER PUBLICATIONS

European Extended Search Report for EP Application 17813738.6, Search completed Oct. 18, 2019, dated Oct. 24, 2019, 9 pages.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Extended European Search Report for European Application EP12828956.8, Report Completed Feb. 18, 2015, dated Mar. 2, 2015, 13 Pages.
Federal Computer Week, "Tool Speeds Info to Vehicles", Jul. 25, 1999, 5 pages.
HTTP Live Streaming Overview, Networking & Internet, Apple, Inc., Apr. 1, 2011, 38 pages.
IBM Corporation and Microsoft Corporation, "Multimedia Programming Interface and Data Specifications 1.0", Aug. 1991, printed from http://www.kk.iij4u.or.jp/~kondo/wave/mpidata.txton Mar. 6, 2006, 100 pgs.
Information Technology—MPEG Systems Technologies—Part 7: Common Encryption in ISO Base Media File Format Files (ISO/IEC 23001-7), Apr. 2015, 24 pgs.
Information Week, "Internet on Wheels", InformationWeek: Front End: Daily Dose, Jul. 20, 1999, Printed on Mar. 26, 2014, 3 pgs.
International Preliminary Report on Patentability for International Application No. PCT/US2008/083816, dated May 18, 2010, 6 pgs.
International Preliminary Report on Patentability for International Application No. PCT/US2012/053052, Completed Mar. 4, 2014, 8 pgs.
International Preliminary Report on Patentability for International Application No. PCT/US2012/053223, Report dated Mar. 4, 2014, 7 pgs.
International Preliminary Report on Patentability for International Application PCT/US2011/067167, dated Feb. 25, 2014, 8 pgs.
International Preliminary Report on Patentability for International Application PCT/US2017/031114, Report dated Dec. 18, 2018, dated Dec. 27, 2018, 7 Pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2012/053052, International Filing Date Aug. 30, 2012, Report Completed Oct. 25, 2012, dated Nov. 16, 2012, 9 pgs.
International Search Report and Written Opinion for International Application No. PCT/US2012/053223, International Filing Date Aug. 30, 2012, Report Completed Dec. 7, 2012, dated Mar. 7, 2013, 10 pgs.
International Search Report and Written Opinion for International Application No. PCT/US2017/031114, Search completed Jun. 29, 2017, dated Jul. 19, 2017, 11 Pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2012/053053, search completed Oct. 23, 2012, dated Nov. 13, 2012, 11 pgs.
International Search Report for International Application No. PCT/SE2011/050166, Search completed Mar. 30, 2011, dated Mar. 30, 2011, 5 Pgs.
ISO/IEC 14496-12 Information technology—Coding of audio-visual objects—Part 12: ISO base media file format, Feb. 2004 ("MPEG-4 Part 12 Standard"), 62 pgs.
ISO/IEC 14496-12:2008(E) Informational Technology—Coding of Audio-Visual Objects Part 12: ISO Base Media File Format, Oct. 2008, 120 pgs.
ISO/IEC FCD 23001-6 MPEG systems technologies Part 6: Dynamic adaptive streaming over HTTP (DASH), Jan. 28, 2011, 86 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys® : "Enjoy your digital music and pictures on your home entertainment center, without stringing wires!", Model No. WMA

(56) References Cited

OTHER PUBLICATIONS 11B, printed May 9, 2007 from http://www.linksys.com/servlet/Satellite?c=L_Product_C2&childpagename=US/Layout&cid=1115416830950&p.
Microsoft Corporation, "Chapter 8, Multimedia File Formats" 1991, Microsoft Windows Multimedia Programmer's Reference, 3 cover pgs, pp. 8-1 to 8-20.
Microsoft Corporation, Advanced Systems Format (ASF) Specification, Revision 01.20.03, Dec. 2004, 121 pgs.
Microsoft Media Platform: Player Framework, "Microsoft Media Platform Player Framework v2.5 (formerly Silverlight Media Framework)", May 3, 2011, 2 pages.
Microsoft Media Platform: Player Framework, "Silverlight Media Framework v1.1", Jan. 2010, 2 pages.
Microsoft Windows® XP Media Center Edition 2005, Frequently asked Questions, printed May 4, 2007 from http://www.microsoft.com/windowsxp/mediacenter/evaluation/faq.mspx.
Microsoft Windows® XP Media Center Edition 2005: Features, printed May 9, 2007, from http://www.microsoft.com/windowsxp/mediacenter/evaluation/features.mspx, 4 pgs.
MPEG-DASH presentation at Streaming Media West 2011, Nov. 2011, 14 pgs.
Multiview Video Coding (MVC), ISO/IEC 14496-10, 2008 Amendment.
Open DML AVI-M-JPEG File Format Subcommittee, "Open DML AVI File Format Extensions", Version 1.02, Feb. 28, 1996, 29 pgs.
pc world.com, Future Gear: PC on the HiFi, and the TV, from http://www.pcworld.com/article/id,108818-page,1/article.html, printed May 4, 2007, from IDG Networks, 2 pgs.
Pomelo, LLC Tech Memo, Analysis of Netflix's Security Framework for 'Watch Instantly' Service, Mar.-Apr. 2009, 18 pgs.
Qtv—About BroadQ, printed May 11, 2009 from http://www.broadq.com/en/about.php, 1 pg.
Server-Side Stream Repackaging (Streaming Video Technologies Panorama, Part 2), Jul. 2011, 15 pgs.
Supplementary European Search Report for Application No. EP 04813918, Search Completed Dec. 19, 2012, 3 pgs.
Text of ISO/IEC 23001-6: Dynamic adaptive streaming over HTTP (DASH), Oct. 2010, 71 pgs.
Universal Mobile Telecommunications System (UMTS), ETSI TS 126 233 V9.1.0 (Jun. 2011) 3GPP TS 26.233 version 9.1.0 Release 9, 18 pgs.
Universal Mobile Telecommunications Systems (UMTS); ETSI TS 126 244 V9.4.0 (May 2011) 3GPP TS 26.244 version 9.4.0 Release 9, 58 pgs.
Windows Media Center Extender for Xbox, printed May 9, 2007 from http://www.xbox.com/en-US/support/systemuse/xbox/console/mediacenterextender.htm, 2 pgs.
Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
"Adaptive HTTP Streaming in PSS—Client Behaviour", S4-AHI129, 3GPP TSG-SA4 Ad-Hoc Meeting, Dec. 14-16, 2009, Paris, France section 12.6.1.
"Adaptive HTTP Streaming in PSS—Data Formats for HTTP-Streaming excluding MPD", S4-AHI128, 3GPP TSGSA4 Ad-Hoc Meeting, Dec. 14-16, 2009, Paris,France; sections 12.2.1 and 12.2.4.2.1.
"Adaptive HTTP Streaming in PSS—Discussion on Options", S4-AHI130, 3GPP TSG-SA4 Ad-Hoc Meeting, Dec. 14-16, 2009, Paris, France; sections 1, 2.7-2.8, and 2.16-2.19.
"Adaptive Streaming Comparison", Jan. 28, 2010, 5 pgs.
"Apple HTTP Live Streaming specification", Aug. 2017, 60 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"Data Encryption Decryption using AES Algorithm, Key and Salt with Java Cryptography Extension", Available at https://www.digizol.com/2009/10/java-encrypt-decrypt-jce-salt.html, Oct. 200, 6 pgs.
"Delivering Live and On-Demand Smooth Streaming", Microsoft Silverlight, 2009, 28 pgs.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"Fragmented Time Indexing of Representations", S4-AHI126, 3GPP TSG-SA4 Ad-Hoc Meeting, Dec. 14-16, 2009, Paris, France.
"HTTP Based Adaptive Streaming over HSPA", Apr. 2011, 73 pgs.
"HTTP Live Streaming", Mar. 2011, 24 pgs.
"HTTP Live Streaming", Sep. 2011, 33 pgs.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Information Technology—Coding of Audio Visual Objects—Part 2: Visual", International Standard, ISO/IEC 14496-2, Third Edition, Jun. 1, 2004, pp. 1-724. (presented in three parts).
"Java Cryptography Architecture API Specification & Reference", Available at https://docs.oracle.com/javase/1.5.0/docs/guide/security/CryptoSpec.html, Jul. 25, 2004, 68 pgs.
"Java Cryptography Extension, javax.crypto.Cipher class", Available at https://docs.oracle.com/javase/1.5.0/docs/api/javax/crypto/Cipher.html, 2004, 24 pgs.
"JCE Encryption—Data Encryption Standard (DES) Tutorial", Available at https://mkyong.com/java/jce-encryption-data-encryption-standard-des-tutorial/, Feb. 25, 2009, 2 pgs.
"KISS Players, KISS DP-500", retrieved from http://www.kiss-technology.com/?p=dp500 on May 4, 2007, 1 pg.
"Live and On-Demand Video with Silverlight and IIS Smooth Streaming", Microsoft Silverlight, Windows Server Internet Information Services 7.0, Feb. 2010, 15 pgs.
"Microsoft Smooth Streaming specification", Jul. 22, 2013, 56 pgs.
"MPEG ISO/IEC 13818-1", Information Technology—Generic Coding of Moving Pictures and Associated Audio: Systems, Apr. 25, 1995, 151 pages.
"MPEG-4, Part 14, ISO/IEC 14496-14", Information technology—Coding of audio-visual objects, 18 pgs., Nov. 15, 2003.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"QCast Tuner for PS2", printed May 11, 2009 from http://web.archive.org/web/20030210120605/www.divx.com/software/detail.php?ie=39, 2 pgs.
"Single-Encode Streaming for Multiple Screen Delivery", Telestream Wowza Media Systems, 2009, 6 pgs.
"Smooth Streaming Client", The Official Microsoft IIS Site, Sep. 24, 2010, 4 pages.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"The MPEG-DASH Standard for Multimedia Streaming Over the Internet", IEEE MultiMedia, vol. 18, No. 4, 2011, 7 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27, 2013 from code.movideo.com/Transcoding_Best_Practices, 5 pgs.

(56) References Cited

OTHER PUBLICATIONS

"Transparent end-to-end packet switched streaming service (PSS); 3GPP file format (3GP) (Release 9)", 3GPP TS 26.244 V9.0.0 (Dec. 2009), sections 7.1-7.4.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
"Windows Media Player 9", Microsoft, Mar. 23, 2017, 3 pgs.
"DVD-Mpeg differences", printed on Jul. 2, 2009, http://dvd.sourceforge.net/dvdinfo/dvdmpeg.html, 1 pg.
U.S. Appl. No. 13/224,298, "Final Office Action Received", dated May 19, 2014, 26 pgs.
Abomhara et al., "Enhancing Selective Encryption for H.264/AVC Using Advanced Encryption Standard", International Journal of computer Theory and Engineering, Apr. 2010, vol. 2, No. 2, pp. 223-229.
Akhshabi et al., "An Experimental Evaluation of Rate-Adaptation Algorithms in Adaptive Streaming over HTTP", MMSys'11, Feb. 23-25, 2011, 12 pgs.
Alattar et al., A.M. "Improved selective encryption techniques for secure transmission of MPEG video bit-streams", In Proceedings 1999 International Conference on Image Processing (Cat. 99CH36348), vol. 4, IEEE, 1999, pp. 256-260.
Anonymous, "Method for the encoding of a compressed video sequence derived from the same video sequence compressed at a different bit rate without loss of data", ip.com, ip.com No. IPCOM000008165D, May 22, 2002, pp. 1-9.
Antoniou et al., "Adaptive Methods for the Transmission of Video Streams in Wireless Networks", 2015, 50 pgs.
Apostolopoulos et al., "Secure Media Streaming and Secure Transcoding", Multimedia Security Technologies for Digital Rights Management, 2006, 33 pgs.
Asai et al., "Essential Factors for Full-Interactive VOD Server: Video File System, Disk Scheduling, Network", Proceedings of Globecom '95, Nov. 14-16, 1995, 6 pgs.
Beker et al., "Cipher Systems, The Protection of Communications", 1982, 40 pgs.
Blasiak, "Video Transrating and Transcoding: Overview of Video Transrating and Transcoding Technologies", Ingenient Technologies, TI Developer Conference, Aug. 6-8, 2002, 22 pgs.
Bocharov et al, "Portable Encoding of Audio-Video Objects, The Protected Interoperable File Format (PIFF)", Microsoft Corporation, First Edition Sep. 8, 2009, 30 pgs.
Bulterman et al., "Synchronized Multimedia Integration Language (SMIL 3.0)", W3C Recommendation, Dec. 1, 2008, https://www.w3.org/TR/2008/REC-SMIL3-20081201/, 321 pgs. (presented in five parts).
Cahill et al., "Locally Adaptive Deblocking Filter for Low Bit Rate Video", Proceedings 2000 International Conference on Image Processing, Sep. 10-13, 2000, Vancouver, BC, Canada, 4 pgs.
Candelore, U.S. Appl. No. 60/372,901, filed Apr. 17, 2002.
Casares et al., "Simplifying Video Editing Using Metadata", DIS2002, 2002, pp. 157-166.
Chaddha et al., "A Frame-work for Live Multicast of Video Streams over the Internet", Proceedings of 3rd IEEE International Conference on Image Processing, Sep. 19, 1996, Lausanne, Switzerland, 4 pgs.
Cheng, "Partial Encryption for Image and Video Communication", Thesis, Fall 1998, 95 pgs.

Cheng et al., "Partial encryption of compressed images and videos", IEEE Transactions on Signal Processing, vol. 48, No. 8, Aug. 2000, 33 pgs.
Cheung et al., "On the Use of Destination Set Grouping to Improve Fairness in Multicast Video Distribution", Proceedings of IEEE INFOCOM'96, Conference on Computer Communications, vol. 2, IEEE, 1996, 23 pgs.
Collet, "Delivering Protected Content, an Approach for Next Generation Mobile Technologies", Thesis, 2010, 84 pgs.
Deutscher, "IIS Transform Manager Beta—Using the MP4 to Smooth Task", Retrieved from https://web.archive.org/web/20130328111303/http://blog.johndeutscher.com/category/smooth-streaming, Blog post of Apr. 29, 2011, 14 pgs.
Diamantis et al., "Real Time Video Distribution using Publication through a Database", Proceedings SIBGRAPI'98. International Symposium on Computer Graphics, Image Processing, and Vision (Cat. No.98EX237), Oct. 1990, 8 pgs.
Ding, Li-Fu et al., "Content-Aware Prediction Algorithm With Inter-View Mode Decision for Multiview Video Coding", IEEE Transactions on Multimedia, vol. 10, No. 8, Dec. 2008., Dec. 8, 2008, 12 Pages.
Dworkin, "Recommendation for Block Cipher Modes of Operation: Methods and Techniques", NIST Special Publication 800-38A, 2001, 66 pgs.
Fang et al., "Real-time deblocking filter for MPEG-4 systems", Asia-Pacific Conference on Circuits and Systems, Oct. 28-31, 2002, Bail, Indonesia, pp. 541-544.
Fecheyr-Lippens, "A Review of HTTP Live Streaming", Jan. 2010, 38 pgs.
Fielding et al., "Hypertext Transfer Protocol—HTTP1.1", Network Working Group, RFC 2616, Jun. 1999, 114 pgs.
Fukuda et al., "Reduction of Blocking Artifacts by Adaptive DCT Coefficient Estimation in Block-Based Video Coding", Proceedings 2000 International Conference on Image Processing, Sep. 10-13, 2000, Vancouver, BC, Canada, pp. 969-972.
Gannes, "The Lowdown on Apple's HTTP Adaptive Bitrate Streaming", GigaOM, Jun. 10, 2009, 12 pgs.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric "The Wireless Digital Picture Frame Arrives", Wi-Fi Planet, printed May 4, 2007 from http://www.wi-fiplanet.com/news/article.php/3093141, Oct. 16, 2003, 3 pgs.
Huang, U.S. Pat. No. 7,729,426, U.S. Appl. No. 11/230,794, filed Sep. 20, 2005.
Huang et al., "Adaptive MLP post-processing for block-based coded images", IEEE Proceedings—Vision, Image and Signal Processing, vol. 147, No. 5, Oct. 2000, pp. 463-473.
Huang et al., "Architecture Design for Deblocking Filter in H.264/JVT/AVC", 2003 International Conference on Multimedia and Expo., Jul. 6-9, 2003, Baltimore, MD, 4 pgs.
Inlet Technologies, "Adaptive Delivery to iDevices", 2010, 2 pages.
Inlet Technologies, "Adaptive delivery to iPhone 3.0", 2009, 2 pgs.
Inlet Technologies, "HTTP versus RTMP", 2009, 3 pages.
Inlet Technologies, "The World's First Live Smooth Streaming Event: The French Open", 2009, 2 pages.
I-O Data, "Innovation of technology arrived", Nov. 2004, Retrieved from http://www.iodata.com/catalogs/AVLP2DVDLA_Flyer200505.pdf, 2 pgs.
Jain et al., U.S. Appl. No. 61/522,623, filed Aug. 11, 2011.
Jeannin, Sylvie et al., "Video Motion Representation for Improved Content Access", IEEE Transactions on Consumer Electronics, vol. 46, No. 3., Aug. 2004, 11 Pages.
Jung et al., "Design and Implementation of an Enhanced Personal Video Recorder for DTV", IEEE Transactions on Consumer Electronics, vol. 47, No. 4, Nov. 2001, 6 pgs.
Kalva, Hari "Delivering MPEG-4 Based Audio-Visual Services", 2001, 113 pgs.
Kang et al., "Access Emulation and Buffering Techniques for Steaming of Non- Stream Format Video Files", IEEE Transactions on Consumer Electronics, vol. 43, No. 3, Aug. 2001, 7 pgs.

(56) References Cited

OTHER PUBLICATIONS

Karouia et al., "Video Similarity Measurement Based on Attributed Relational Graph Matching", N.T. Nguyen, R. Katarzyniak(Eds.): New Challenges in Applied Intelligence Technologies, SCI 134, pp. 173-182, 2008., 2008, 10 Pages.

Kim, Seon H. et al., "Design and implementation of geo-tagged video search framework", Journal of Visual Communication and Image Representation, 2010, vol. 21 (2010), pp. 773-786.

Kim et al, "A Deblocking Filter with Two Separate Modes in Block-Based Video Coding", IEEE transactions on circuits and systems for video technology, vol. 9, No. 1, 1999, pp. 156-160.

Kim et al., "Tree-Based Group Key Agreement", Feb. 2004, 37 pgs.

Kurzke et al., "Get Your Content Onto Google TV", Google, Retrieved from: http://commondatastorage.googleapis.com/io2012/presentations/live%20to%20website/1300.pdf, 2012, 58 pgs.

Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.

Laukens, "Adaptive Streaming—A Brief Tutorial", EBU Technical Review, 2011, 6 pgs.

Legault et al., "Professional Video Under 32-bit Windows Operating Systems", SMPTE Journal, vol. 105, No. 12, Dec. 1996, 10 pgs.

Levkov, "Mobile Encoding Guidelines for Android Powered Devices", Adobe Systems Inc., Addendum B, Dec. 22, 2010, 42 pgs.

Lewis, "H.264/MPEG-4 AVC CABAC overview", Oct. 25, 2012, printed Jun. 24, 2013 from http://www.web.archive.org/web/20121025003926/www.theonlineoasis.co.uk/notes.html, 3 pgs.

Li et al., "Layered Video Multicast with Retransmission (LVMR): Evaluation of Hierarchical Rate Control", Proceedings of IEEE INFOCOM'98, the Conference on Computer Communications. Seventeenth Annual Joint Conference of the IEEE Computer and Communications Societies. Gateway to the 21st Century, Cat. No. 98, vol. 3, 1998, 26 pgs.

List et al., "Adaptive deblocking filter", IEEE transactions on circuits and systems for video technology, vol. 13, No. 7, Jul. 2003, pp. 614-619.

Long et al., "Silver: Simplifying Video Editing with Metadata", Demonstrations, CHI 2003: New Horizons, Apr. 5-10, 2003, pp. 628-629.

Massoudi et al., "Overview on Selective Encryption of Image and Video: Challenges and Perspectives", EURASIP Journal on Information Security, Nov. 2008, 18 pgs.

McCanne et al., "Receiver-driven Layered Multicast", Conference proceedings on Applications, technologies, architectures, and protocols for computer communications, Aug. 1996, 14 pgs.

Meier, "Reduction of Blocking Artifacts in Image and Video Coding", IEEE Transactions on Circuits and Systems for Video Technology, vol. 9, No. 3, Apr. 1999, pp. 490-500.

Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.

MSDN, "Adaptive streaming, Expression Studio 2.0", Apr. 23, 2009, 2 pgs.

Nelson, "Arithmetic Coding + Statistical Modeling = Data Compression Part 1—Arithmetic Coding", Doctor Dobb's Journal, Feb. 1991, USA, pp. 1-12.

Nelson, "Smooth Streaming Deployment Guide", Microsoft Expression Encoder, Aug. 2010, 66 pgs.

Newton et al., "Preserving Privacy by De-identifying Facial Images", Carnegie Mellon University School of Computer Science, Technical Report, CMU-CS-03-119, Mar. 2003, 26 pgs.

Noboru, "Play Fast and Fine Video on Web! codec", Co.9 No. 12, Dec. 1, 2003, pp. 178-179.

Noe, A. "Matroska File Format (under construction!)", Retrieved from the Internet: URL:http://web.archive.orgweb/20070821155146/www.matroska.org/technical/specs/matroska.pdf [retrieved on Jan. 19, 2011], Jun. 24, 2007, 1-51.

Noe, Alexander "AVI File Format", http://www.alexander-noe.com/video/documentation/avi.pdf, Dec. 14, 2006, pp. 1-26.

Noe, Alexander "Definitions", Apr. 11, 2006, retrieved from http://www.alexander-noe.com/video/amg/definitions.html on Oct. 16, 2013, 2 pages.

O'Brien, U.S. Appl. No. 60/399,846, filed Jul. 30, 2002.

O'Rourke, "Improved Image Decompression for Reduced Transform Coding Artifacts", IEEE Transactions on Circuits and Systems for Video Technology, vol. 5, No. 6, Dec. 1995, pp. 490-499.

Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.

Ozer, Jan "Adaptive Streaming in the Field", Streaming Media, Dec. 2010-Jan. 2011, pp. 36-47.

Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.

Park et al., "A postprocessing method for reducing quantization effects in low bit-rate moving picture coding", IEEE Transactions on Circuits and Systems for Video Technology, vol. 9, No. 1, Feb. 1999, pp. 161-171.

Phamdo, "Theory of Data Compression", printed on Oct. 10, 2003, 12 pgs.

RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.

Richardson, "H.264 and MPEG-4 Video Compression", Wiley, 2003, 306 pgs. (presented in 2 parts).

Schulzrinne et al., "Real Time Streaming Protocol (RTSP)", Internet Engineering Task Force, RFC 2326, Apr. 1998, 80 pgs.

Siglin, "HTTP Streaming: What You Need to Know", streamingmedia.com, 2010, 15 pages.

Siglin, "Unifying Global Video Strategies, MP4 File Fragmentation for Broadcast, Mobile and Web Delivery", Nov. 16, 2011, 16 pgs.

Sima et al., "An Efficient Architecture for Adaptive Deblocking Filter of H.264 AVC Video Coding", IEEE Transactions on Consumer Electronics, vol. 50, No. 1, Feb. 2004, pp. 292-296.

Spanos et al., "Performance Study of a Selective Encryption Scheme for the Security of Networked, Real-Time Video", Proceedings of the Fourth International Conference on Computer Communications and Networks, IC3N'95, Sep. 20-23, 1995, Las Vegas, NV, pp. 2-10.

Srinivasan et al., "Windows Media Video 9: overview and applications", Signal Processing: Image Communication, 2004, 25 pgs.

Stockhammer, "Dynamic Adaptive Streaming over HTTP—Standards and Design Principles", Proceedings of the second annual ACM conference on Multimedia, Feb. 2011, pp. 133-145.

Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 pg.

Timmerer et al., "HTTP Streaming of MPEG Media", Proceedings of Streaming Day, 2010, 4 pgs.

Tiphaigne et al., "A Video Package for Torch", Jun. 2004, 46 pgs.

Trappe et al., "Key Management and Distribution for Secure Multimedia Multicast", IEEE Transaction on Multimedia, vol. 5, No. 4, Dec. 2003, pp. 544-557.

Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.

Unknown, "Entropy and Source Coding (Compression)", TCOM 570, 1999-9, pp. 1-22.

Unknown, "MPEG-4 Video Encoder: Based on International Standard ISO/IEC 14496-2", Patni Computer Systems, Ltd., publication date unknown, 15 pgs.

Van Deursen et al., "On Media Delivery Protocols in the Web", 2010 IEEE International Conference on Multimedia and Expo, Jul. 19-23, 2010, 6 pgs.

Ventura, Guillermo Albaida "Streaming of Multimedia Learning Objects", AG Integrated Communication System, Mar. 2003, 101 pgs.

Waggoner, "Compression for Great Digital Video", 2002, 184 pgs.

(56) References Cited

OTHER PUBLICATIONS

Watanabem et al., "MPEG-2 decoder enables DTV trick plays", esearcher System LSI Development Lab, Fujitsu Laboratories Ltd., Kawasaki, Japan, Jun. 2001, 2 pgs.
Watson, Mark "Input for DASH EE#1 (CMP): Pixel Aspect Ratio", 94. MPEG Meeting; Oct. 11, 2010-Oct. 15, 2010; Guangzhou; (Motion Picture Expert Group or ISO/IEC JTC1/SC29/WG11), No. M18498, Oct. 28, 2010 (Oct. 28, 2010), XP030047088,, Oct. 2, 2010, 4 Pages.
Wiegand, "Joint Video Team (JVT) of ISO/IEC MPEG and ITU-T VCEG", Jan. 2002, 70 pgs.
Willig et al., U.S. Appl. No. 61/409,285, filed Nov. 2, 2010.
Yang et al., "Projection-Based Spatially Adaptive Reconstruction of Block-Transform Compressed Images", IEEE Transactions on Image Processing, vol. 4, No. 7, Jul. 1995, pp. 896-908.
Yang et al., "Regularized Reconstruction to Reduce Blocking Artifacts of Block Discrete Cosine Transform Compressed Images", IEEE Transactions on Circuits and Systems for Video Technology, vol. 3, No. 6, Dec. 1993, pp. 421-432.
Yu et al., "Video deblocking with fine-grained scalable complexity for embedded mobile computing", Proceedings 7th International Conference on Signal Processing, Aug. 31-Sep. 4, 2004, pp. 1173-1178.
Zakhor, "Iterative Procedures for Reduction of Blocking Effects in Transform Image Coding", IEEE Transactions on Circuits and Systems for Video Technology, vol. 2, No. 1, Mar. 1992, pp. 91-95.
Zambelli, "IIS Smooth Streaming Technical Overview", Microsoft Corporation, Mar. 2009.
Extended European Search Report for European Application No. 14800901.2, Search completed Dec. 2, 2016, dated Dec. 13, 2016, 13 Pgs.
International Preliminary Report on Patentability for International Application PCT/US2014/039425, Report dated Nov. 24, 2015, dated Dec. 3, 2015, 6 Pgs.
International Search Report and Written Opinion for International Application PCT/US14/39425, International Filing Date Mar. 23, 2014, Report Completed Sep. 15, 2014, dated Oct. 17, 2014, 9 Pgs., dated Oct. 17, 2014.
Westerink et al., "Two-pass MPEG-2 variable-bit-rate encoding", IBM Journal of Research and Development, International Business Machines Corporation, New York, NY, US, XP002395114, ISSN: 0018-8646, vol. 43, No. 4, Jul. 4, 1999, pp. 471-488.
Wu et al., "A Hierarchical Reliability-Driven Scheduling for Cloud Video Transcoding", International Conference on Machine Learning and Cybernetics, Jul. 12, 2015, pp. 456-461.

\* cited by examiner

| Actual Resolution | DivX Plus Bitrate | Final Resolution | Frames Per Second | Level | Average Bitrate for Level | Maximum Profile Bitrate |
|---|---|---|---|---|---|---|
| 1920x1080 | 8969 | 1920x1080 | 30 | 9 | 8435 | 8400 |
| 1920x1080 | 8482 | 1920x1080 | 25 | | | |
| 1920x1040 | 7854 | 1920x1040 | 24 | | | |
| 1440x1080 | 5747 | 1920x1080 | 30 | 8 | 5378 | 5300 |
| 1440x1080 | 5438 | 1920x1080 | 25 | | | |
| 1920x816 | 5406 | 1920x816 | 24 | | | |
| 1920x800 | 5248 | 1920x800 | 24 | | | |
| 1440x1040 | 5053 | 1920x1040 | 24 | | | |
| 1440x816 | 3557 | 1920x816 | 24 | 7 | 3508 | 3500 |
| 1440x800 | 3459 | 1920x800 | 24 | | | |
| 1280x720 | 2736 | 1920x1080 | 30 | 6 | 2666 | 2400 |
| 1280x720 | 2596 | 1920x1080 | 25 | | | |
| 960x720 | 1895 | 1920x1080 | 30 | 5 | 1742 | 1750 |
| 1152x624 | 1860 | 1920x1040 | 24 | | | |
| 960x720 | 1802 | 1920x1080 | 25 | | | |
| 1280x544 | 1789 | 1920x816 | 24 | | | |
| 1152x480 | 1366 | 1920x800 | 24 | | | |
| 960x544 | 1281 | 1920x816 | 24 | 4 | 1144 | 1200 |
| 960x520 | 1220 | 1920x1040 | 24 | | | |
| 960x400 | 931 | 1920x800 | 24 | | | |
| 768x432 | 857 | 1920x1080 | 30 | 3 | 796 | 800 |
| 768x432 | 822 | 1920x1080 | 25 | | | |
| 768x416 | 783 | 1920x1040 | 24 | | | |
| 720x408 | 720 | 1920x816 | 24 | | | |
| 768x320 | 600 | 1920x800 | 24 | 2 | 600 | 600 |
| 576x312 | 456 | 1920x1040 | 24 | 1 | 418 | 400 |
| 640x272 | 445 | 1920x816 | 24 | | | |
| 512x288 | 407 | 1920x1080 | 30 | | | |
| 512x288 | 400 | 1920x1080 | 25 | | | |
| 576x240 | 382 | 1920x800 | 24 | | | |

*FIG. 5*

| Streaming Bitrate | Aspect Ratio, Frames Per Second | | | | |
|---|---|---|---|---|---|
| | 16:9, 29.97 or 30 | 16:9, 25 | 1.85:1, 23.976 or 24 | 2.35:1, 23.976 or 24 | 2.4:1, 23.976 or 24 |
| 400 | 768x432 | 768x432 | 768x416 | 768x328 | 768x320 |
| 600 | 768x432 | 768x432 | 768x416 | 768x328 | 768x320 |
| 800 | 768x432 | 768x432 | 768x416 | 768x328 | 768x320 |
| 1200 | 768x432 | 768x432 | 768x416 | 768x328 | 768x320 |
| 1750 | 1280x720 | 1280x720 | 1152x624 | 1280x544 | 1152x480 |
| 2400 | 1280x720 | 1280x720 | 1152x624 | 1280x544 | 1152x480 |
| 3500 | 1920x1080 | 1920x1080 | 1920x1040 | 1920x816 | 1920x800 |
| 5300 | 1920x1080 | 1920x1080 | 1920x1040 | 1920x816 | 1920x800 |
| 8400 | 1920x1080 | 1920x1080 | 1920x1040 | 1920x816 | 1920x800 |

FIG. 6

SYSTEMS AND METHODS FOR ENCODING AND STREAMING VIDEO ENCODED USING A PLURALITY OF MAXIMUM BITRATE LEVELS

CROSS-REFERENCE TO RELATED APPLICATIONS

The current application is a continuation of U.S. patent application Ser. No. 16/789,303, filed Feb. 12, 2020, which is a continuation of U.S. patent application Ser. No. 15/922,198, filed Mar. 15, 2018 and issued May 5, 2020 as U.S. Pat. No. 10,645,429, which is a continuation of U.S. patent application Ser. No. 13/600,046, filed Aug. 30, 2012, and issued Apr. 24, 2018 as U.S. Pat. No. 9,955,195, which claims priority to U.S. Provisional Patent Application No. 61/529,201, filed Aug. 30, 2011, the disclosures of which are incorporated herein by reference.

FIELD OF THE INVENTION

The present invention relates to the delivery of multimedia content, specifically streaming video content encoded at a variety of recommended maximum bitrates optimized for a variety of scaled display resolutions and network connection maximum data rates of playback devices receiving the streams.

BACKGROUND OF THE INVENTION

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bitrate streaming or adaptive streaming involves detecting the present streaming conditions (e.g. the user's network bandwidth and CPU capacity) in real time and adjusting the quality of the streamed media accordingly.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Matroska container is a media container developed as an open standard project by the Matroska non-profit organization of Aussonne, France. The Matroska container is based upon Extensible Binary Meta Language (EBML), which is a binary derivative of the Extensible Markup Language (XML). Decoding of the Matroska container is supported by many consumer electronics (CE) devices. The DivX Plus file format developed by DivX, LLC of San Diego, Calif. utilizes an extension of the Matroska container format, including elements that are not specified within the Matroska format.

SUMMARY OF THE INVENTION

Systems and methods in accordance with embodiments of the invention stream and play back video having a variety of resolutions, frame rates, and/or sample aspect ratios, where the video streams are encoded at one of a limited number of maximum bit rate levels. One embodiment includes a processor, and storage containing an encoding application and data relating combinations of resolution and frame rates to maximum bitrates, where a plurality of resolution and frame rates that are related to the same maximum bitrate form a maximum bitrate level. In addition, the encoding application configures the processor to encode a video stream as a plurality of video streams having different resolutions and frame rates, where the target maximum bitrate used during the encoding of the video streams is selected based upon the maximum bitrate levels of the resolution and frame rate combinations indicated within the data relating combinations of resolution and frame rates to maximum bitrates.

In a further embodiment, the resolution and frame rates within a maximum bitrate level have optimal target maximum bitrates that are within a predetermined percentage of the highest optimal target maximum bitrate of a resolution and frame rate combination within the maximum bitrate level.

In another embodiment, the optimal target maximum bitrate of a resolution and frame rate combination is determined using a formula.

In a still further embodiment, the optimal target maximum bitrate of a resolution and frame rate combination is determined using experimentation.

In still another embodiment, the resolution and frame rates within a maximum bitrate level have optimal target maximum bitrates that are within a predetermined percentage of the optimal target maximum bitrate of at least one other resolution and frame rate combination within the maximum bitrate level.

In a yet further embodiment, the data relating combinations of resolution and frame rates to maximum bitrate levels relates the resolution and frame rates to maximum bitrates in the manner illustrated in FIG. 5.

Yet another embodiment includes a plurality of playback devices, where the playback devices have different display aspect ratios and utilize different types of network connections, and a streaming system comprising a plurality of servers on which a plurality of video streams are stored, where the plurality of video streams are encoded at different resolutions and frame rates. In addition, video streams stored on the streaming system are encoded using one of a plurality of maximum bitrate levels, where video streams having different resolutions and frame rates are encoded at the same maximum bitrate level, the playback devices are configured to support playback of video data encoded at maximum bitrates corresponding to a plurality of the maximum bitrate levels, the playback devices are configured to request video data from at least one video stream from the streaming system encoded at a maximum bitrate level supported by the playback device, and the playback devices are configured to playback video data encoded at a supported maximum bitrate level received from the streaming system.

A further embodiment again also includes a source encoder including storage containing data relating combinations of resolution and frame rates to maximum bitrate levels. In addition, the source encoder is configured to encode a video stream as a plurality of video streams having different resolutions and frame rates, where the target maximum bitrate used during the encoding of the video streams is selected based upon the maximum bitrate levels of the resolution and frame rate combinations indicated within the data relating combinations of resolution and frame rates to maximum bitrates levels.

In another embodiment again, the data relating combinations of resolution and frame rates to maximum bitrate levels relates the resolution and frame rates to maximum bitrate levels in the manner illustrated in FIG. 5.

A further additional embodiment includes a machine readable medium containing processor instructions, where execution of the instructions by a processor causes the processor to perform a process for determining a set of maximum bitrate levels for encoding video data for use in a streaming system including playback devices having different display aspect ratios and network connections. In addition, the process includes selecting a set of resolution and frame rate combinations, determining the optimal target maximum bitrate for encoding a stream of video data at each resolution and frame rate combination, grouping the resolution and frame rate combinations into maximum bitrate levels based upon the optimal target maximum bitrates of the resolution and frame rate combinations utilizing at least one grouping criterion, and determining a target maximum bitrate for the resolution and frame rate combinations in a maximum bitrate level.

In another additional embodiment, the optimal target maximum bitrate of a resolution and frame rate combination is determined using a formula.

In a still yet further embodiment, the optimal target maximum bitrate of a resolution and frame combination is determined using experimentation.

In still yet another embodiment, the at least one grouping criterion groups resolution and frame rates within a maximum bitrate level that have optimal target maximum bitrates that are within a predetermined percentage of the highest optimal target maximum bitrate of a resolution and frame rate combination within the maximum bitrate level.

In a still further embodiment again, the at least one grouping criterion groups resolution and frame rates within a maximum bitrate level that have optimal target maximum bitrates that are within a predetermined percentage of the optimal target maximum bitrate of at least one other resolution and frame rate combination within the maximum bitrate level.

In still another embodiment again, determining a target maximum bitrate for the resolution and frame rate combinations in a maximum bitrate level includes selecting the maximum optimal target bitrate of a resolution and frame rate combination within the maximum bitrate level.

In a still further additional embodiment, determining a target maximum bitrate for the resolution and frame rate combinations in a maximum bitrate level includes selecting the minimum optimal target bitrate of a resolution and frame rate combination within the maximum bitrate level.

In still another additional embodiment, determining a target maximum bitrate for the resolution and frame rate combinations in a maximum bitrate level includes selecting the average optimal target bitrate of the resolution and frame rate combinations within the maximum bitrate level.

A yet further embodiment again also includes rounding the average optimal target bitrate using a predetermined rounding function.

In yet another embodiment again, determining a target maximum bitrate for the resolution and frame rate combinations in a maximum bitrate level includes selecting one of a plurality known network data rates based upon the optimal target data rate of at least one of the resolution and frame rate combinations within the maximum bitrate level.

BRIEF DESCRIPTION OF THE DRAWINGS

FIG. 5 is a table illustrating an example of a set of resolutions with encoded bitrates matched to maximum profile bitrates in accordance with an embodiment of the invention.

FIG. 6 is a table illustrating an example of sets of resolutions for different aspect ratios, where the resolutions in each set are encoded so that each aspect ratio is encoded at a resolution falling within each of the maximum bitrate levels in accordance with an embodiment of the invention.

DETAILED DISCLOSURE OF THE INVENTION

Figure 1:
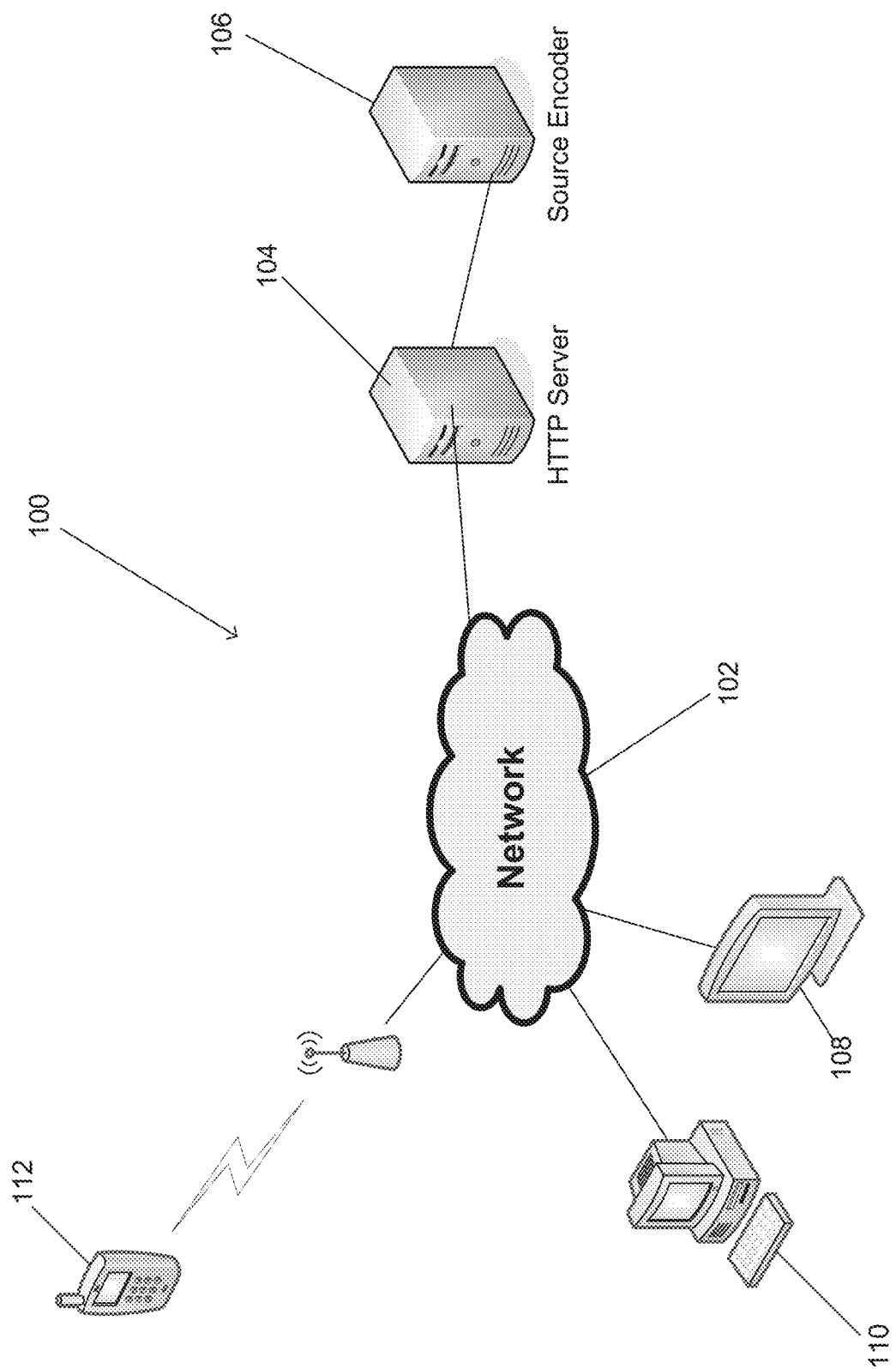
FIG. 1 is a network diagram of a level bitrate adaptive streaming system in accordance with an embodiment of the invention.

Turning now to the drawings, systems and methods for streaming and playing back video having a variety of resolutions, frame rates, and/or sample aspect ratios, where the video streams are encoded at one of a limited number of maximum bit rate levels, in accordance with embodiments of the invention are illustrated. Video data is typically encoded to achieve a target maximum bitrate. The quality of video encoded with a specific resolution, and frame rate typically does not improve appreciably beyond a specific maximum bitrate threshold. Beyond that threshold, increasing the resolution of the encoded video can increase video quality. A formula can be used to recommend an optimal target maximum bitrate at which to encode video content at a specific resolution and frame rate efficiently and with the highest video quality achievable at the selected resolution. Alternatively, the bitrate threshold at which video quality does not appreciably improve can be determined through testing. While it can be beneficial to determine the optimal maximum bitrate at which to encode a specific piece of video content to efficiently achieve the highest quality video at a specific resolution and frame rate, the delivery of a large number of streams of video content to a large variety of playback devices can be simplified by specifying a limited number of maximum bitrates at which video can be encoded irrespective of the optimal target maximum bitrate for a specific frame rate and resolution combination. The ability of a specific type of playback device to playback video encoded at a specific maximum bitrate is typically confirmed via testing. Therefore, the smaller the number of maximum bitrate levels supported by a streaming system, the simpler the process of testing each playback device to confirm its ability to playback video encoded at supported target maximum bitrates. Accordingly, streaming systems can utilize a set of maximum bitrate levels to simply the process of certifying playback devices for use within the streaming system. When video is encoded for distribution via the streaming system at a number of different resolutions and frame rates, the maximum bitrate levels appropriate to each of the specific resolution and frame combinations can be selected and used as the target maximum bitrates when encoding the streams of video data.

In several embodiments, the process of selecting a set of maximum bitrate levels to use when encoding video for distribution via a streaming system involves determining the most popular aspect ratios and frame rates for video content and then determining all of the streaming resolutions and frame rates at which the video content will be encoded. When the most likely resolution and frame rate combinations are identified, the optimal target maximum bitrates for each resolution and frame rate combination can be determined using an appropriate bitrate formula or testing. Bitrate formulas that can be utilized to determine a optimal target maximum bitrate at which to encode video at a specified resolution and frame rate are discussed in U.S. patent application Ser. No. 13/432,521 entitled "Systems and Methods for Encoding Alternative Streams of Video for Playback on Playback Devices having Predetermined Display Aspect Ratios and Network Connection Maximum Data Rates", to Soroushian et al., filed Mar. 28, 2012 (the disclosure of which is incorporated by reference herein in its entirety). The optimal target maximum bitrates can then be grouped into levels and a maximum bitrate determined for each level.

In several embodiments, the resolution and frame rate combinations can be grouped into levels based upon their corresponding optimal target maximum bitrates so that all optimal target maximum bitrates within a group are within a predetermined percentage of the highest optimal target maximum bitrate within the group. In many embodiments, the resolution and frame rate combinations can be grouped into levels based upon their corresponding optimal target maximum bitrates so that each optimal target maximum bitrate within the group is within a predetermined percentage of the next highest optimal target maximum bitrate within the group. In other embodiments, any of a variety of grouping criteria can be utilized in accordance with embodiments of the invention including criteria that group resolution and frame rate combinations into a predetermined number of groups based upon their optimal target maximum bitrates.

The maximum bitrate that is assigned to the resolution and frame rate combinations at a level can be determined in any number of different ways including (but not limited to) the average bitrate of the optimal target maximum bitrates included in the group, the minimum bitrate of the optimal target maximum bitrates included in the level, and/or a typical network connection data rate that is close to one or more of the target maximum bitrates in the level. The maximum bitrate determined for each level can then be used to encode content at the resolution and frame rate combinations within the level. In several embodiments, the process of determining the maximum bitrate levels is performed in a first process and the maximum bit rate levels and the resolution and frame rate combinations that fall within each level can be provided to a source encoding system for use in the encoding of video content.

In many embodiments, the streaming system is an adaptive bitrate streaming system. Adaptive bitrate streaming systems can stream alternative streams of video data encoded at maximum bitrates. In order to provide the highest quality video experience independent of the network data rate, the adaptive bitrate streaming systems switch between the available streams of video data throughout the delivery of the video data according to a variety of factors, including, but not limited to, the available network data rate and video decoder performance. Systems and methods for switching between video streams during playback are disclosed in U.S. patent application Ser. No. 13/221,682 entitled "Systems and Methods for Adaptive Bitrate Streaming of Media Stored in Matroska Container Files Using Hypertext Transfer Protocol" to Braness et al., filed Aug. 30, 2011, the disclosure of which is incorporated by reference herein in its entirety. In adaptive bitrate streaming systems, a number of alternative streams are likely to be encoded having the same aspect ratio, but different resolutions. Systems and methods for selecting the resolutions at which to encode alternative streams of video for use in adaptive bitrate streaming systems are described in U.S. patent application Ser. No. 13/430,032 entitled "Selection of Resolutions for Seamless Resolution Switching of Multimedia Content" to Soroushian et al., filed Mar. 26, 2012 (the disclosure of which is incorporated by reference herein in its entirety). Although much of the discussion that follows references adaptive bitrate streaming systems, systems and methods in accordance with embodiments of the invention can be utilized in streaming systems that are non-adaptive. Systems and methods for streaming video at a plurality of resolution and frame rates using a smaller set of maximum bit rate levels in accordance with embodiments of the invention are discussed further below.

System Overview

A streaming system in accordance with an embodiment of the invention is illustrated in FIG. 1. The streaming system 100 includes a source encoder 106 configured to encode source video as a number of alternative video streams. Alternative streams are streams that encode the same media content in different ways. In many instances, alternative streams encode media content (such as but not limited to video) at different resolution and sample aspect ratio combinations and different maximum bitrates. In a number of embodiments, alternative video streams form sets of alternative video streams encoded with the same aspect ratio corresponding to the display aspect ratio of a set of playback devices. In many embodiments, the source encoder possesses a lookup table that indexes resolution and frame rate combinations to a predetermined set of maximum bitrate levels. The source encoder uses the lookup table to determine the target maximum bitrate at which to encode video at a specific resolution and frame rate combination.

In many embodiments, the streaming system is an adaptive bitrate streaming system and the source encoder encodes each alternative stream into a separate container file and generates a top level index file describing each of the streams contained within the container files. The top level index file and the container files are uploaded to an HTTP server 104. In other embodiments, the container files are uploaded to an HTTP server 104 and the top level index file is dynamically generated in response to a request for a specific piece of content by a playback device. In the illustrated embodiment, the source encoder is a server. In other embodiments, the source encoder can be any processing device including a processor and sufficient resources to perform the transcoding of source media (including but not limited to video, audio, and/or subtitles).

In the illustrated embodiment, playback devices include personal computers 110, CE players 108, and mobile phones 112. In other embodiments, playback devices can include consumer electronics devices such as DVD players, Blu-ray players, televisions, set top boxes, video game consoles, tablets, and other devices that are capable of connecting to a server via HTTP and playing back encoded media. In the illustrated embodiment, a variety of playback devices use HTTP or another appropriate stateless protocol to request portions of a top level index file and the container files via a network 102 such as the Internet. Prior to a playback device performing adaptive bitrate streaming using portions of media from alternative streams contained within the container files, a bandwidth probe can be performed by the playback device to determine available bandwidth. Once the bandwidth probe has been completed, the playback device can utilize data within the top level index including (but not limited to) the maximum bitrate of each of the available streams to determine the initial streams from which to commence requesting portions of encoded media as part of an adaptive streaming process.

Once playback of content from the initial set of streams commences, the playback device utilizes the top level index to perform adaptive bitrate streaming of the content in response to changes in streaming conditions. In many adaptive bitrate streaming systems, the playback device can progress through a series of operational phases in which the playback device responds differently in each phase to changes in the streaming conditions. In a number of embodiments, stability in streaming conditions or improving streaming conditions can result in a transition to a phase in which the playback device assumes stable operating conditions, buffers more content, and is less responsive to fluctuations in streaming conditions. In many embodiments, a deterioration in streaming conditions results in a stream switch to a set of streams at a lower resolution utilizing less bandwidth and resulting in the playback device transitioning to a phase in which the playback device assumes unstable operating conditions, buffers less content, and responds rapidly to variations in streaming conditions.

Source Encoders

Figure 2:
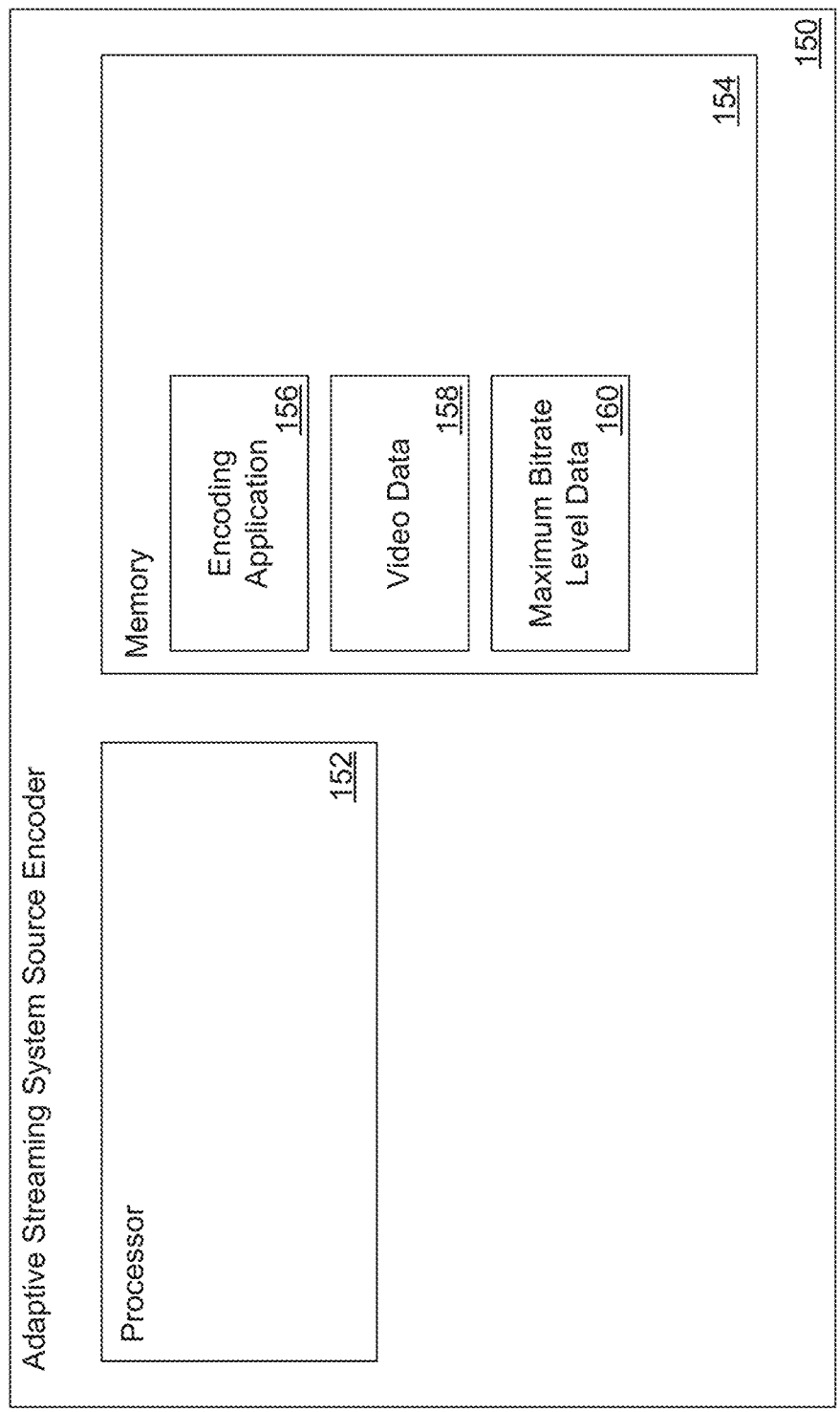
FIG. 2 conceptually illustrates a playback device configured to deliver video data encoded utilizing target maximum bitrate levels in accordance with an embodiment of the invention.

Source encoders in accordance with embodiments of the invention are utilized to encode source content at any of a number of resolutions and frame rates at target maximum bitrates determined using a set of predetermined maximum bitrate levels. The basic architecture of a source encoder in accordance with an embodiment of the invention is illustrated in FIG. 2. The source encoder 150 includes a processor 152 in communication with memory 154. In the illustrated embodiment, the memory 154 includes an encoding application 156, video data 158, which can include (but is not limited to) source video data and encoded alternative streams of video data, and data describing the target maximum bitrates at which to encode a plurality of resolution and frame rate combinations 160. In many embodiments, the target maximum bitrates are selected from a set of predetermined maximum bitrate levels that includes a number of levels that is smaller than the number of resolution and frame rate combinations. In certain embodiments, a plurality of resolution and frame rate combinations is associated with each of a plurality of maximum bitrate levels. In several embodiments, the data concerning target maximum bitrate levels is a lookup table that is indexed by resolution and frame rate combinations and associates specific maximum bitrate levels with specific resolution and frame rate combinations. In other embodiments, any of a variety of data structures can be utilized to identify a target maximum bitrate from a predetermined set of target maximum bitrates to utilize in the encoding of a specific resolution and frame rate combination.

Although a specific architecture is illustrated in FIG. 2, any of a variety of architectures including architectures where the application and/or set of predetermined maximum bitrate levels are located on disk or some other form of storage and is loaded into memory at runtime can be utilized to implement a source encoder in accordance with an embodiment of the invention. Furthermore, any of a variety of system architectures including (but not limited to) the system architecture illustrated in FIG. 1 can be utilized to perform video delivery in accordance with embodiments of the invention. Systems and methods for determining a predetermined set of maximum bitrate levels at which to encode video at a plurality of resolution and frame combinations in accordance with embodiments of the invention are discussed further below.

Determining Target Maximum Bitrates

The initial step in determining a set of predetermined bitrates at which to encode video is determining the characteristics of the video that is likely to be streamed by a streaming system. Once the resolution and frame rate combinations of the video that is likely to be streamed are identified, the optimal target maximum bitrate of each resolution and frame rate combination can be calculated and the results used to determine a set of maximum bitrate levels at which video can be encoded for different resolution and frame rate combinations. The term optimal target maximum bitrate can be used to describe the maximum bitrate beyond which video quality at a specific resolution and frame rate does not appreciably increase. Stated another way, the optimal target maximum bitrate is the lowest bitrate at which the highest quality video can be achieved at a given resolution and frame rate. In using a term such as optimal target maximum bitrate, there is typically an acknowledgement that video quality is subjective. Therefore, there is no concept of a "true" optimal target maximum bitrate. The optimal target maximum bitrate is simply a value that can be determined through subjective experimentation. In many instances, observations concerning target maximum bitrates have resulted in the definition of functions that can be utilized to calculate an optimal target maximum bitrate based upon the resolution and frame rate. As is discussed further below, the technique for determining an optimal target maximum bitrate is not as important as the manner in which that maximum bitrates are utilized to select maximum bitrate levels.

Figure 3:
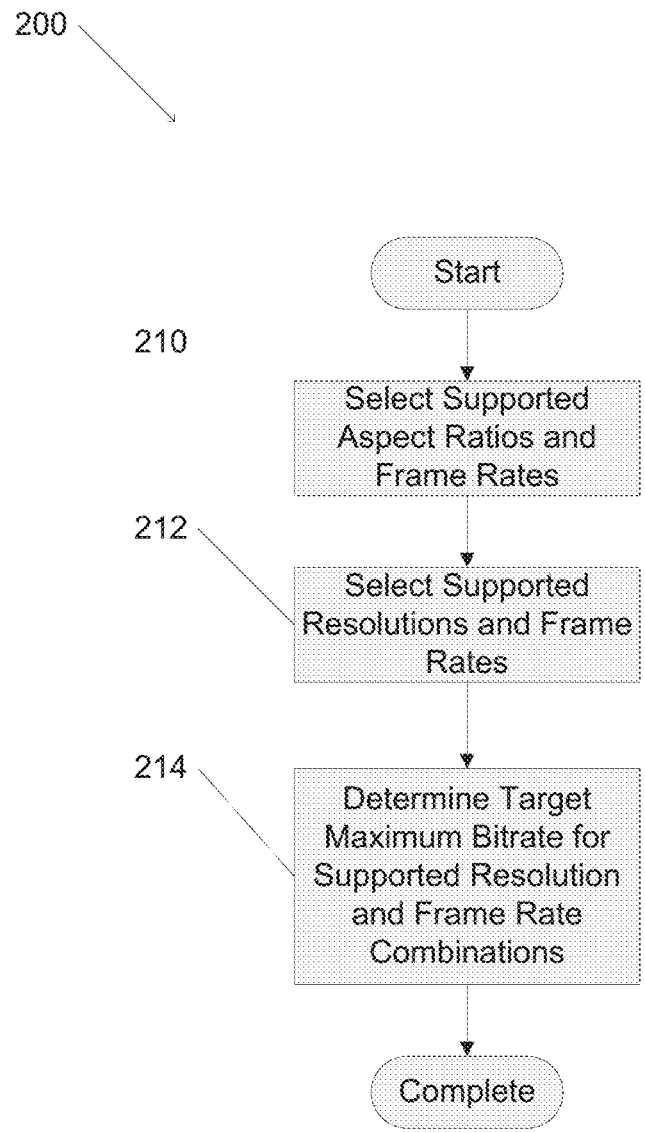
FIG. 3 is a flow chart illustrating a process for determining a set of bitrates given video data in accordance with an embodiment of the invention.

A process for determining optimal target maximum bitrates for video streamed within an adaptive bitrate streaming system in accordance with embodiments of the invention is illustrated in FIG. 3. The process 200 commences by selecting 210 display aspect ratios and frame rates supported by the streaming system. The display aspect ratios and frame rates are typically determined based upon popular display aspect ratios and frame rates supported by playback devices that are likely to be used to stream video within the streaming system. Resolutions can be determined 212 based upon the selected display aspect ratios and, in many instances, based upon anticipated maximum data rates supported within the streaming system. Processes for determining resolutions at which to encode alternative video streams based upon the display aspect ratio of a playback device are described in U.S. patent application Ser. No. 13/430,032 entitled "Selection of Resolutions for Seamless Resolution Switching of Multimedia Content" to Soroushian et al., filed Mar. 26, 2012 (incorporated by reference above).

An optimal target maximum bitrate is determined (214) for each selected frame rate and resolution combination. In several embodiments, maximum bitrate targets are determined 214 utilizing a bitrate formula where the bitrate formula may utilize various aspects of the video data, including frame rate, resolution, and other pertinent information as input. Examples of appropriate bitrate formulas are described in U.S. Patent Application No. "Systems and Methods for Encoding Alternative Streams of Video for Playback on Playback Devices having Predetermined Display Aspect Ratios and Network Connection Maximum Data Rates", to Soroushian et al., filed Mar. 28, 2012 (incorporated by reference above). In a number of embodiments, the determination (214) of the optimal target maximum bitrate for a specific resolution and frame rate combination may involve subjective or objective quality evaluation methods of the video data encoded at the target maximum bitrate. Once the optimal target maximum bitrates for each of the resolution and frame rate combinations is determined, a process can then be performed to identify a set of maximum bitrate can be selected based upon the optimal target maximum bitrates. Processes for determining a set of maximum bitrate levels based upon a set of optimal target maximum bitrates associated with specific resolution and frame rate combinations in accordance with embodiments of the invention are discussed below.

Generating Sets of Maximum Bitrate Levels

Figure 4:
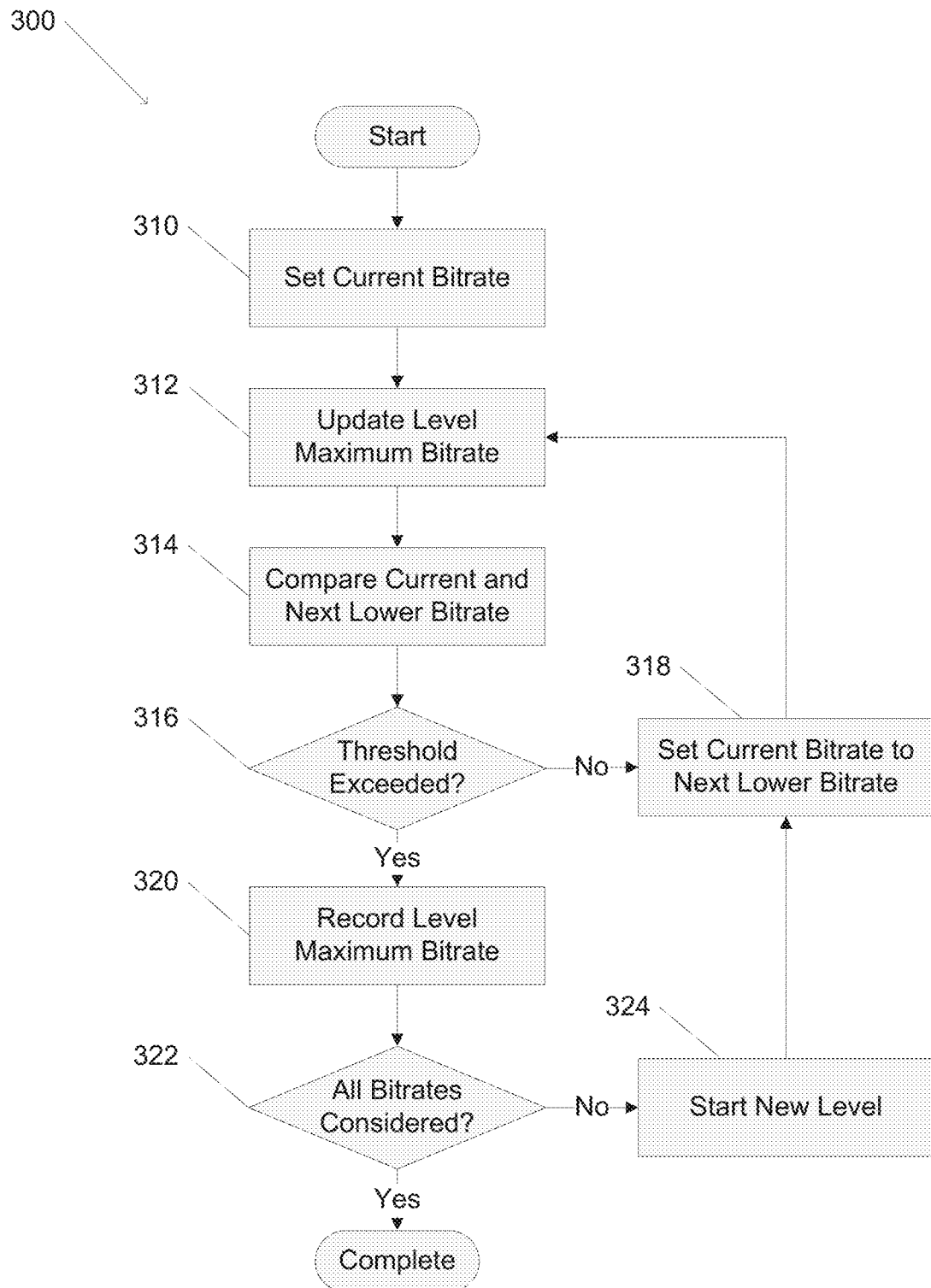
FIG. 4 is a flow chart illustrating a process for determining a set of encoding maximum bitrate levels in accordance with an embodiment of the invention.

A process for determining a set of maximum bitrate levels based upon a set of optimal target maximum bitrates associated with specific resolution and frame rate combinations in accordance with an embodiment of the invention is illustrated in FIG. 4. The process 300 involves setting (310) the current bitrate to the highest optimal target maximum bitrate from a set of optimal target maximum bitrates. The level maximum bitrate is updated (312) utilizing the current bitrate. In many embodiments, the level maximum bitrate may be set to the average, median, minimum, or maximum combination of the bitrates in the current bitrate level. In a number of embodiments, the level average bitrate is a linear or non-linear combination of the bitrates in the current bitrate level. In other embodiments, the level maximum bitrate can be determined after all of the levels are identified.

The current bitrate is compared (314) to the next lower optimal target maximum bitrate in the input set of optimal target maximum bitrates. A decision (316) is then made. Given a threshold value, if the difference between the current bitrate and the next lower optimal target maximum bitrate does not exceed the threshold value, the current bitrate is included in the optimal maximum bitrate level. In other embodiments, any of a variety of criteria can be utilized to determine whether to include a specific resolution and frame rate combination in a level based upon the optimal target maximum bitrate for the resolution and frame combination. Accordingly, the current bitrate is set (318) to the next lower optimal target maximum bitrate and the process loops back to updating (312) the level maximum bitrate. In several embodiments, the threshold value is a percentage difference between consecutive bitrate levels, such as 10%. In several embodiments, the threshold value is a fixed value or is related in a non-linear manner to the value of the current bitrate. If the threshold value is exceeded, the level maximum bitrate is recorded (320) in the set of maximum bitrate levels. In several embodiments, the level bitrate level is rounded to the closest whole number. Another decision (322) is made. If target maximum bitrates remain to be considered, a new level bitrate is started (324), the current bitrate is set (318) to the next highest optimal target maximum bitrate, and the process continues updating (312) the level maximum bitrate of the new level. The process 300 is complete when all bitrates have been considered.

In a number of embodiments, the maximum bitrate levels and the resolutions and frame rates assigned to specific groups can be modified in accordance with the requirements of a specific application. For example, the optimal maximum bitrate at each level can be rounded down (or up) to the closest whole-number multiple of 10, 100 or 1000. Although a specific process is illustrated in FIG. 4, any of a variety of processes can be utilized including a process that groups resolution and frame rate combinations into a predetermined number of levels based upon one or more criteria including (but not limited to) maximizing the similarity of the optimal target maximum bitrates of the resolution and frame combinations at each level.

An example of a grouping of a set of maximum bitrate levels defined based on the resolution, and frame rate of encoded video in accordance with an embodiment of the invention is illustrated in FIG. 5.

For example, in many embodiments of the invention 1440×816 is a sub-resolution for video data having a primary resolution of 1920×816 at 24 frames per second with a sample aspect ratio of 4:3. Likewise, the resolution 1440× 800 is a sub-resolution for video data having a primary resolution of 1920×800 at 24 frames per second with a sample aspect ratio of 4:3. The encoded maximum bitrate of the 1440×816 video is 3,557 Kbps and the encoded maximum bitrate of the 1440×800 video is 3,459 Kbps. In several embodiments, 1440×816 and 1440×800 are within a threshold value of each other and no other resolutions are within the threshold value. The average bitrate for these resolutions is 3,508 Kbps, rounded to 3,500 Kbps. In accordance with an embodiment of the invention, 3,500 Kbps will be one maximum bitrate in the set of maximum profile bitrates.

In order to stream video content at each maximum bitrate level, a variety of resolutions may be utilized depending on the sample aspect ratio and frame rate of the source content. An example profile of recommended resolutions based on the frame rate and primary aspect ratio of the video content for various maximum bitrates is illustrated in FIG. 6. In many embodiments of the invention, the same resolution may be utilized for multiple frame rates and sample aspect ratios in order to maximize the subjective and/or objective quality of the streamed video data.

Although the present invention has been described in certain specific aspects, many additional modifications and variations would be apparent to those skilled in the art. It is therefore to be understood that the present invention may be practiced otherwise than specifically described, including playback devices where the set of streaming switching conditions utilized by the playback device are continuously changing, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for encoding source content as a plurality of alternative video streams and adaptively streaming the plurality of alternative video streams, each having a bitrate, the method comprising:
   identifying source video content;
   identifying a plurality of resolutions for encoding of video content;
   for each particular resolution of the plurality of resolutions:
      encoding at least a portion of the source video content multiple times using the particular resolution and multiple different target bitrates for the particular resolution; and
      evaluating quality for each of the multiple encodings;
   selecting a plurality of resolution and target bitrate combinations for a plurality of alternative streams based on the evaluated quality of each of the multiple encodings;
   uploading encodings of a plurality of sections of the source video content at each of the selected plurality of resolution and target bitrate combinations for the plurality of alternative streams to a set of servers that form part of a content distribution system;

generating entries in a top level index describing at least one of the plurality of alternative streams;

providing the generated top level index from the content distribution system to a one or more playback devices capable of performing adaptive streaming using the encodings of the plurality of sections; and responding to requests from the one or more playback devices, where the requests include requests for specific encodings from the encodings of the plurality of sections.

2. The method of claim 1 further comprising assembling the encodings of the plurality of sections for a given alternative stream into a video container file.

3. The method of claim 2 further comprising generating entries in a container index within each container file indicating sizes of portions of the given alternative stream within the video container file.

4. The method of claim 1, wherein adaptively streaming the encodings comprises receiving at least one request for an encoded section of one of the plurality of alternative streams from the one or more playback devices based on the generated top level index.

5. The method of claim 1, wherein generating entries in the top level index is performed in response to receiving a request for the source video content from the one or more playback devices.

6. The method of claim 1, wherein identifying a plurality of resolutions comprises identifying resolutions with target bitrates within a predetermined percentage of a bitrate associated with an alternative stream of the plurality of alternative streams.

7. The method of claim 1, wherein both a width and a height of each resolution of the plurality of resolutions have an integer number of pixels.

8. The method of claim 1, wherein each resolution of the plurality of resolutions has a same display aspect ratio and at least two resolutions of the plurality of resolutions have different sample aspect ratios.

9. The method of claim 1, wherein the target bitrate for each resolution is determined using a formula.

10. The method of claim 1, wherein the target bitrate of a given resolution is determined using experimentation.

11. A non-transitory machine readable medium containing processor instructions for encoding source content as a plurality of alternative video streams and adaptively streaming the plurality of alternative video streams, each having a bitrate, where execution of the instructions by a processor causes the processor to perform a process that comprises:

identifying source video content;

identifying a plurality of resolutions for encoding of video content;

for each particular resolution of the plurality of resolutions:

encoding at least a portion of the source video content multiple times using the particular resolution and multiple different target bitrates for the particular resolution; and evaluating quality for each of the multiple encodings;

selecting a plurality of resolution and target bitrate combinations for a plurality of alternative streams based on the evaluated quality of each of the multiple encodings;

uploading encodings of a plurality of sections of the source video content at each of the selected plurality of resolution and target bitrate combinations for the plurality of alternative streams to a set of servers that form part of a content distribution system;

generating entries in a top level index describing at least one of the plurality of alternative streams;

providing the generated top level index from the content distribution system to one or more playback devices capable of performing adaptive streaming using the encodings of the plurality of sections; and responding to requests from the one or more playback devices, where the requests include requests for specific encodings from the encodings of the plurality of sections.

12. The non-transitory machine readable medium of claim 11, wherein the process further comprises assembling the encodings of the plurality of sections for a given alternative stream into a video container file.

13. The non-transitory machine readable medium of claim 12, wherein the process further comprises generating entries in a container index within each container file indicating sizes of portions of the given alternative stream within the video container file.

14. The non-transitory machine readable medium of claim 11, wherein adaptively streaming the encodings comprises receiving at least one request for an encoded section of one of the plurality of alternative streams from the one or more playback devices based on the generated top level index.

15. The non-transitory machine readable medium of claim 11, wherein generating entries in the top level index is performed in response to receiving a request for the source video content from the one or more playback devices.

16. The non-transitory machine readable medium of claim 11, wherein identifying a plurality of resolutions comprises identifying resolutions with target bitrates within a predetermined percentage of a bitrate associated with an alternative stream of the plurality of alternative streams.

17. The non-transitory machine readable medium of claim 11, wherein both a width and a height of each resolution of the plurality of resolutions have an integer number of pixels.

18. The non-transitory machine readable medium of claim 11, wherein each resolution of the plurality of resolutions has a same display aspect ratio and at least two resolutions of the plurality of resolutions have different sample aspect ratios.

19. The non-transitory machine readable medium of claim 11, wherein the target bitrate for each resolution is determined using a formula.

* * * * *